(12) United States Patent
Takagi et al.

(10) Patent No.: US 8,244,541 B2
(45) Date of Patent: Aug. 14, 2012

(54) CONTENT CREATION SYSTEM, CONTENT CREATION METHOD, COMPUTER EXECUTABLE PROGRAM FOR EXECUTING THE SAME CONTENT CREATION METHOD, COMPUTER READABLE STORAGE MEDIUM HAVING STORED THE SAME PROGRAM, GRAPHICAL USER INTERFACE SYSTEM AND DISPLAY CONTROL METHOD

(75) Inventors: Hironobu Takagi, Yokohama (JP); Chieko Asakawa, Kawasaki (JP)

(73) Assignee: Nuance Communications, Inc., Burlington, MA (US)

( * ) Notice: Subject to any disclaimer, the term of this patent is extended or adjusted under 35 U.S.C. 154(b) by 982 days.

(21) Appl. No.: 12/171,068

(22) Filed: Jul. 10, 2008

(65) Prior Publication Data

US 2008/0276163 A1 Nov. 6, 2008

Related U.S. Application Data

(63) Continuation of application No. 11/254,351, filed as application No. PCT/JP2004/006229 on Apr. 28, 2004, now Pat. No. 7,877,260.

(30) Foreign Application Priority Data

Apr. 30, 2003 (JP) .................................. 2003-125147

(51) Int. Cl.
*G10L 21/00* (2006.01)
*G06F 3/16* (2006.01)
(52) U.S. Cl. ...................... 704/270.1; 704/275; 715/728
(58) Field of Classification Search .................. 704/270, 704/275; 715/234, 727–729, 760
See application file for complete search history.

(56) References Cited

U.S. PATENT DOCUMENTS 5,841,438 A * 11/1998 Cave .............................. 715/723
(Continued)

FOREIGN PATENT DOCUMENTS

EP 1619587 A1 * 1/2006

OTHER PUBLICATIONS

Zhang, "Adding Valid Time to Xpath", 2002, Springer-Verlag, pp. 29-42.*

(Continued)

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

The present invention relates to creating a web page and voice browsing of the web page, and more particularly, it improves accessibility for the voice browsing of the web page through a synthetic voice, efficiently with high reliability.

A content creation system 20 of the present invention is used for creating a content which may be viewed through the synthetic voice, the system including: a database 22 for storing a structured document; and an information process section 24 for creating a speech node series 18 from the structured document, and calculating a reaching time from starting voice synthesis of the speech node series 18 until each node is outputted as the synthetic voice. The information process section 24 includes a support process section 36 to determine a graphic display corresponding to the reaching time, and to visually display the reaching time to a predetermined node by the voice synthesis on a screen of a display section 26.

23 Claims, 18 Drawing Sheets

U.S. PATENT DOCUMENTS

| | | | |
|---|---|---|---|
| 6,381,534 B2* | 4/2002 | Takayama et al. | 701/465 |
| 6,480,191 B1* | 11/2002 | Balabanovic | 345/419 |
| 7,058,695 B2* | 6/2006 | Takagi et al. | 709/217 |
| 7,401,024 B2* | 7/2008 | Haenel et al. | 704/275 |
| 7,457,397 B1* | 11/2008 | Saylor et al. | 379/88.17 |
| 2002/0010715 A1* | 1/2002 | Chinn et al. | 707/514 |
| 2002/0124020 A1* | 9/2002 | Janakiraman et al. | 707/513 |
| 2002/0129373 A1* | 9/2002 | Noda et al. | 725/90 |
| 2003/0065645 A1* | 4/2003 | Itoh et al. | 707/1 |
| 2003/0163285 A1* | 8/2003 | Nakamura et al. | 702/179 |

OTHER PUBLICATIONS

Takagi, "Site-wide Annotation: Reconstructing Existing Pages to be Accessible", Jul. 2002, ACM, pp. 81-88.*

Kitamura, "Speech Pointer" A Non-Visual User Interface Using Speech Recognition and Synthesis 1999, IEEE, pp. 1083-1088.*

Asakawa, "Auditory and Tactile Interfaces for Representing the Visual Effects on the Web", Jul. 2002, ACM, pp. 65-72.*

Asakawa, "Annotation-Based Transcoding for Nonvisual Web Access", Nov. 2000, ACM, pp. 172-179.*

W Asakawa, "User Interface of a Home Page Reader" 1998, ACM, pp. 149-156.*

Takagi, "AccessibilityDesigner: Visualizing usability for the Blind", Oct. 18, 2004, ACM, pp. 177-184.*

U.S. Appl. No. 11/254,351, filed Oct. 20, 2005, Hironobu Takagi et al.

* cited by examiner

[Figure 18]
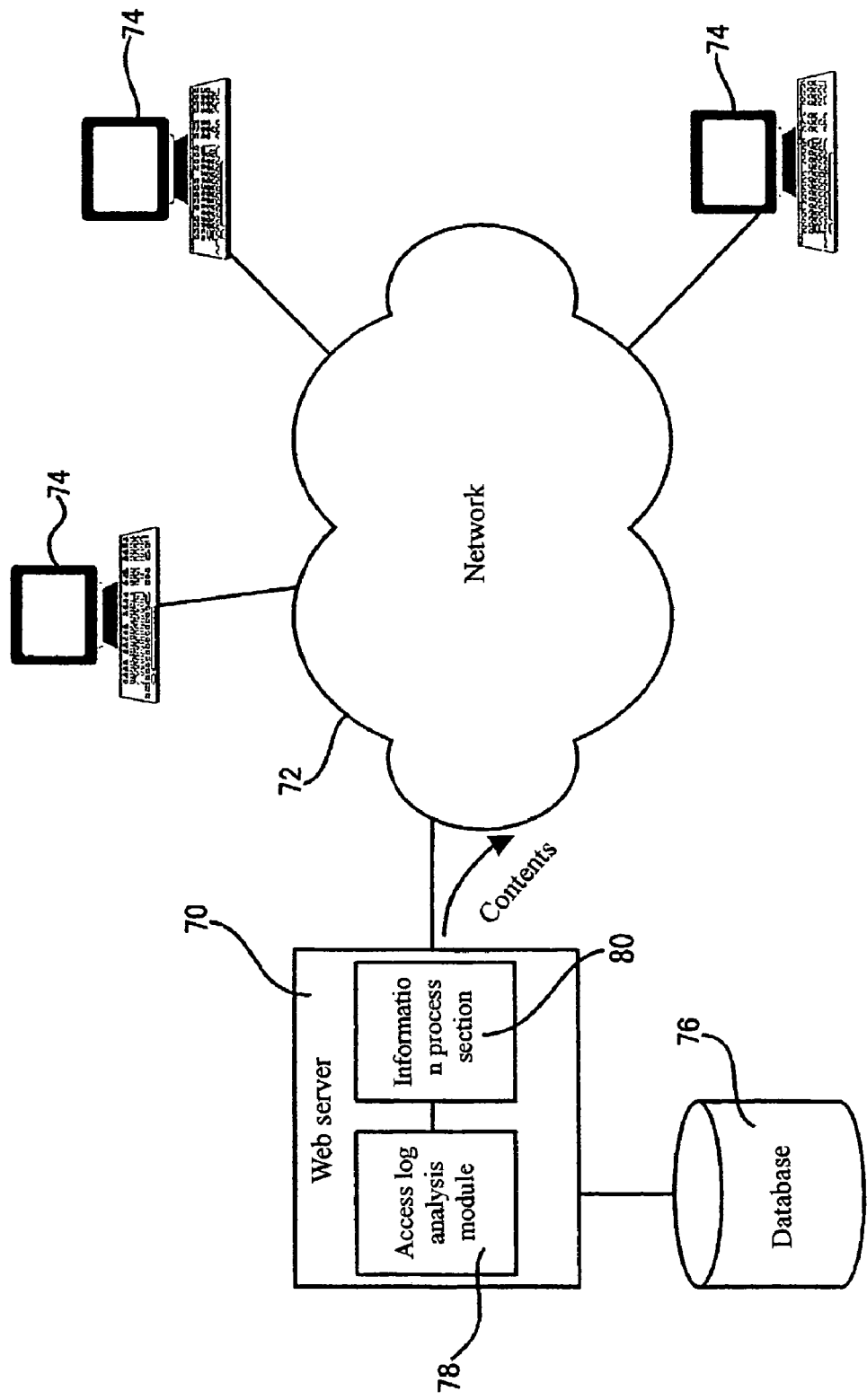

CONTENT CREATION SYSTEM, CONTENT CREATION METHOD, COMPUTER EXECUTABLE PROGRAM FOR EXECUTING THE SAME CONTENT CREATION METHOD, COMPUTER READABLE STORAGE MEDIUM HAVING STORED THE SAME PROGRAM, GRAPHICAL USER INTERFACE SYSTEM AND DISPLAY CONTROL METHOD

RELATED APPLICATIONS

This application claims the benefit under 35 U.S.C. §120, as a continuation application, of U.S. application Ser. No. 11/254,351, entitled "CONTENT CREATION, GRAPHICAL USER INTERFACE SYSTEM AND DISPLAY," filed on Oct. 20, 2005, and now U.S. Pat. No. 7,877,260, which in turn claims priority from International Patent Application No. PCT/JP2004/006229, filed on Apr. 28, 2004, and published in Japanese as PCT Publication No. WO 2004/097656 on Nov. 11, 2004, which in turn claims priority to Japanese Patent Application No. JP2003-125147, filed on Apr. 30, 2003.

FIELD OF THE INVENTION

The present invention relates to creating a web page and voice browsing of the web page, and more particularly, to a content creation system, a content creation method, a program for executing the above described content creation method, a computer readable storage medium having stored the above described program, a graphical user interface system and a display control method, for improving user's accessibility to a content through a synthetic voice.

BACKGROUND ART

In recent years, as network technologies and Internet infrastructure become widespread, a computer user has got to display a web page visually on a screen of a computer via the Internet and acquire various kinds of information. In an existing web page creation method, it is considered first that the web page provides the user with the information visually.

However, with respect to information processability, information acquirability and quickness thereof in a personal computer, the existing web page aimed to provide a graphical user interface has been regarded to have various difficulties. For example, typically the web page is displayed as the graphical user interface on the screen of the computer. In this case, a user who may not recognize the web page visually (hereinafter, in the present invention, referred to as a non-visual access user), may not have enough access to the graphical user interface displayed as the web page, or may not have any access thereto at all, and thereby a disadvantage may occur that the non-visual access user cannot acquire an important content, for example, a main content to be provided through the web page.

As described above, considering usability of the existing web page from the viewpoint of the non-visual access user, it is difficult to say that the existing web page has enough accessibility. Reasons therefor may include, for example, that the non-visual access user may not access the content directly by using pointers and icons, which have their positions controlled by pointer means such as a mouse, a stylus pen, keyboard operations and a joystick, and are displayed as shapes such as arrows and the likes; that two-dimensional to one-dimensional spatial recognitions are completely different from those for a visual access user; and that even if the important main content is highlighted, it may not be recognized by the non-visual access user, and the like.

In order to improve the above described disadvantage even partly, conventionally, a voice response system has been proposed which generates a structured document, such as a text, HTML (Hyper Text Mark-up Language), DHTML (Dynamic Hyper Text Mark-up Language), SGML (Standard Generalized Mark-up Language) and XML (extensible Mark-up Language), as a synthetic voice via a voice synthesis system, and provides it for the non-visual access user by means of a microphone. However, navigation only via voice has had a disadvantage that it may not ensure acquirability of the main content, because it takes a long time for the above described user to reach the main content among contents displayed on the web page, or because the user eventually may not reach the required content.

In addition, for the above described purpose, in a voice browsing system, the voice response system and the like, VoiceXML and the like are used to create the web page including the content suitable for each system to provide services. However since only limited information is provided in such services, these systems may not make a vast amount of information on the web available effectively to the non-visual access user.

The voice browsing system proposed conventionally, with respect to the non-visual access user, uses the same browser as that for an ordinary user (Internet Explorer® or Netscape Navigator®) to access the web page, by means of a voice browser or a screen reader installed at a user site. The conventional voice browsing system has provided the user with the voice navigation by extracting only text information which may be outputted via voice and speaking a file including a word such as "HTML" for example, sequentially from its beginning.

PROBLEMS TO BE SOLVED BY THE INVENTION

Accordingly, a disadvantage may occur that it is very difficult for the conventional voice browsing system to access the information displayed on the web page which has been created for the purpose of visual representation. For example, data having image data or a link to the image data, would lack some of the information thereof to be spoken, if respective alternative texts for such data have not been previously prepared. Moreover, in the web page in recent years, the various kinds of information are included in a single page and laid out by means of various visual effects such as a background color or a text color. However, the voice browsing system may not communicate the visual representation such as highlighting or a layout such as coloring.

In this case, as has been known conventionally, with respect to a jump to the main content, if a link command is inserted at the beginning of the web page, non-visual accessibility may be improved significantly. By selecting this link, the information "having less relation with the main" such as a header and the like, which exists in the beginning direction in the web page, is skipped, and accordingly it is possible to reach the most important information in the web page quickly. However, under the present circumstances, there are very few web pages including the above described command. Additionally, for example, there is a web page in which a template of the web page includes a structure for prompting the non-visual access from the first. However, there is no point in that the link in consideration of the non-visual access only exists, and its purpose may not be achieved without describing the link completely on each web page by each content creator.

Under the present circumstances, it is often the case that the web page given the link to the main content has no description of the link itself, thereby such a web page may not fully achieve a function of giving the link. Therefore, it is also known that even if a request is inputted for executing the non-visual access with respect to the link for the non-visual access, there are problems that the user is turned back to the beginning of the web page, or that an error occurs because a wrong URL of a jump destination is written. The above described link for the non-visual access may even lower the accessibility if it does not function properly.

It may be considered essentially that the above described disadvantages arise from a fact that the visual access user creates the web page. Here, in the present invention, the visual access user means the computer user who can recognize the web page visually to input and acquire the information. In other words, since the visual access user can use ordinary browser software to view the web page without inconvenience, it may be said that he has hardly experienced the access to the web page by means of the voice synthesis. Accordingly, it may be natural in a sense that the visual access user doe not conscious of the disadvantages which often occur in the voice browsing system. Though it is difficult to create all web contents which may be considered at present to meet needs of visually impaired persons, as the network technologies such as the Internet become widespread in recent years, in view of the fact that even the important information may be acquired on the Internet, it has been desired to improve the accessibility to the main content by improving the voice navigation with respect to the existing web contents.

However, based on necessity and importance of improving the accessibility with respect to the non-visual access user, it may be considered that it is possible to improve dramatically tasks by the visual access user who may become a web page creator, if it is possible to support more effectively efforts by a home page creator who deals with modification of the web page to be accessed by the non-visual access user.

SUMMARY OF THE INVENTION

The present invention has been made in view of the above described problems of the prior art, and made based on a conception in which if it is possible to provide the visual access user visually with the accessibility for the non-visual access user, it is possible for the home page creator or the web page creator being the visual access user to provide easily the non-visual access user with the web page having the improved accessibility.

In a web page creation of the present invention, for the above described purpose, if the voice synthesis is executed at a normal speech speed, a reaching time to a node in the structured document is calculated, and the reaching time is associated with a display position of the node on the web page and then displayed visually with respect to the home page creator or the web page creator.

In one particular embodiment of the present invention, the reaching time to a content may be estimated by means of a normal word speech speed in voice synthesis software, and the number of words in an appropriate descriptive language such as a text, HTML, DHTML, SGML and XML, until the above described content is specified. In addition, the estimated reaching time to the content is assigned with a display format corresponding to the reaching time and displayed, for example, on a screen display of the web page or a home page being created. The creator of the home page or the web page may use the display on the screen to evaluate the access by the non-visual access user.

On the other hand, in a content creation system provided by the present invention, the node determined by referring to a graphic display by the creator of the home page or the web page (hereinafter, in the present invention, referred to simply as the creator) is not sent in order of a speech node series obtained according to a predetermined rule from a DOM tree structure of the structured document, but is edited in response to an input by the creator and sent to the voice synthesis system of the non-visual access user. The sent structured document regenerates the speech node series in order specified by the creator with the voice synthesis software, and is provided as the synthetic voice to the non-visual access user. In one particular embodiment of the present invention, it may be possible to navigate the web page by means of a user's terminal arranged at the non-visual access user's site, in the order specified by the creator, without changing a visual configuration of the web page significantly, that is, for example, keeping the same visual display of the web page as that for the visual access user.

Furthermore, in the present invention, it is also possible to use and modify the web page or the home page which has been created once, and it is also possible to provide easily different accessibilities with respect to the non-visual access user who is familiar with voice browsing and the non-visual access user who is not familiar with the voice browsing, by having prepared several types of speech speeds and voice navigations.

Specifically, according to the present invention, a content creation system for creating a content which may be viewed through a synthetic voice is provided, the content creation system including:
a database for storing a structured document; and
an information process section for creating a speech node series from the structured document, and calculating a reaching time from starting voice synthesis of the speech node series until each node is outputted as the synthetic voice.

The information process section of the present invention includes a support process section for editing the speech node series and a corresponding portion in the structured document. In addition, the support process section includes: reaching time calculation means for calculating a reaching time from creating the speech node series until the voice synthesis of a predetermined node is executed; conversion determination means for modifying a graphic display at a display position of the predetermined node in response to the reaching time, and receiving a modification command for instructing to modify the reaching time to the predetermined node; and conversion means for receiving an output from the conversion determination means, creating and outputting a time display mapping table to the outside.

The time display mapping table of the present invention includes the node, the reaching time corresponding to the node, the display position of the node and a graphic display value of the node. The conversion determination means of the present invention includes means for receiving the modification command for instructing to modify the reaching time to the predetermined node, and modifying the speech node series and the structured document at an immediately preceding position of the node specified by the modification command.

According to the present invention, a computer executable content creation method for causing a computer to create a content which may be viewed through a synthetic voice is provided, the method including the steps of:

reading a structured document stored in a database;
creating a speech node series from the structured document;
calculating a reaching time from starting voice synthesis of the speech node series until the voice synthesis of a predetermined node is executed, and associating the node with the reaching time to store them; and
reading the reaching time, and with respect to a display section, giving a graphic display corresponding to the reaching time of the node.

The storing step of the present invention further includes the step of, with respect to the node, associating a display position of the node with a graphic display value of the node to store them. The step of giving the graphic display of the present invention includes the step of modifying the graphic display at a display position of the node in connection with the reaching time. The step of modifying the graphic display in connection with the reaching time of the present invention includes the steps of: receiving a modification command for the reaching time to the predetermined node; in response to the modification command, modifying the speech node series and a corresponding structured document; recalculating the reaching time in the modified speech node series; and modifying the graphic display of the node in connection with the recalculated reaching time. Furthermore, the step of modifying includes the step of: modifying the speech node series at an immediately preceding position of the node of the modification command for instructing to modify the reaching time to the predetermined node.

According to the present invention, a computer executable program for executing the content creation method is provided. In addition, a computer readable storage medium having recorded therein the computer executable program for executing the above described content creation method is provided.

According to the present invention, a graphical user interface system for creating a content which may be viewed through a synthetic voice is provided, the graphical user interface system including:
parser means for parsing a structured document to generate nodes in a DOM tree structure;
means for creating a speech node series from the nodes in the DOM tree structure, and calculating a reaching time from starting voice synthesis of the speech node series until the voice synthesis of a predetermined node is executed; and
means for determining a graphic display at a display position of the predetermined node in response to the reaching time.

In the present invention, the system further includes:
means for receiving a modification command for instructing to modify the reaching time to the predetermined node; and means for modifying the speech node series at an immediately preceding position of the node specified by the modification command and a corresponding portion in the structured document. In the present invention, the means for calculating the reaching time recalculates the reaching time using the modified speech node series; the means for determining the graphic display redetermines the graphic display in response to the recalculated reaching time and displays the modified reaching time with the redetermined graphic display.

According to the present invention, a display control method for functioning a computer as a graphical user interface system for displaying voice accessibility to a content which may be viewed through a synthetic voice, is provided, the display control method including the steps of:
parsing a structured document to generate nodes in a DOM tree structure by means of parser means;
creating a speech node series from the nodes in the DOM tree structure, and calculating a reaching time from starting voice synthesis of the speech node series until the voice synthesis of a predetermined node is executed; and
determining data including a display position of the predetermined node in response to the reaching time, and sending the data via a network to an information terminal.

In the present invention, the method further includes the steps of:
receiving a modification command from the network for instructing to modify the reaching time to the predetermined node; and
modifying the speech node series at an immediately preceding position of the node specified by the modification command and a corresponding portion in the structured document. Furthermore, the step of calculating the reaching time recalculates the reaching time using the modified speech node series; the step of determining data redetermines the graphic display in response to the recalculated reaching time and sends edited data corresponding to the modified reaching time with the redetermined graphic display.

BRIEF DESCRIPTION OF THE DRAWINGS

FIG. 18 shows an embodiment of a web page creation support system of the present invention including service log analysis means.

PREFERRED EMBODIMENT

Figure 1:
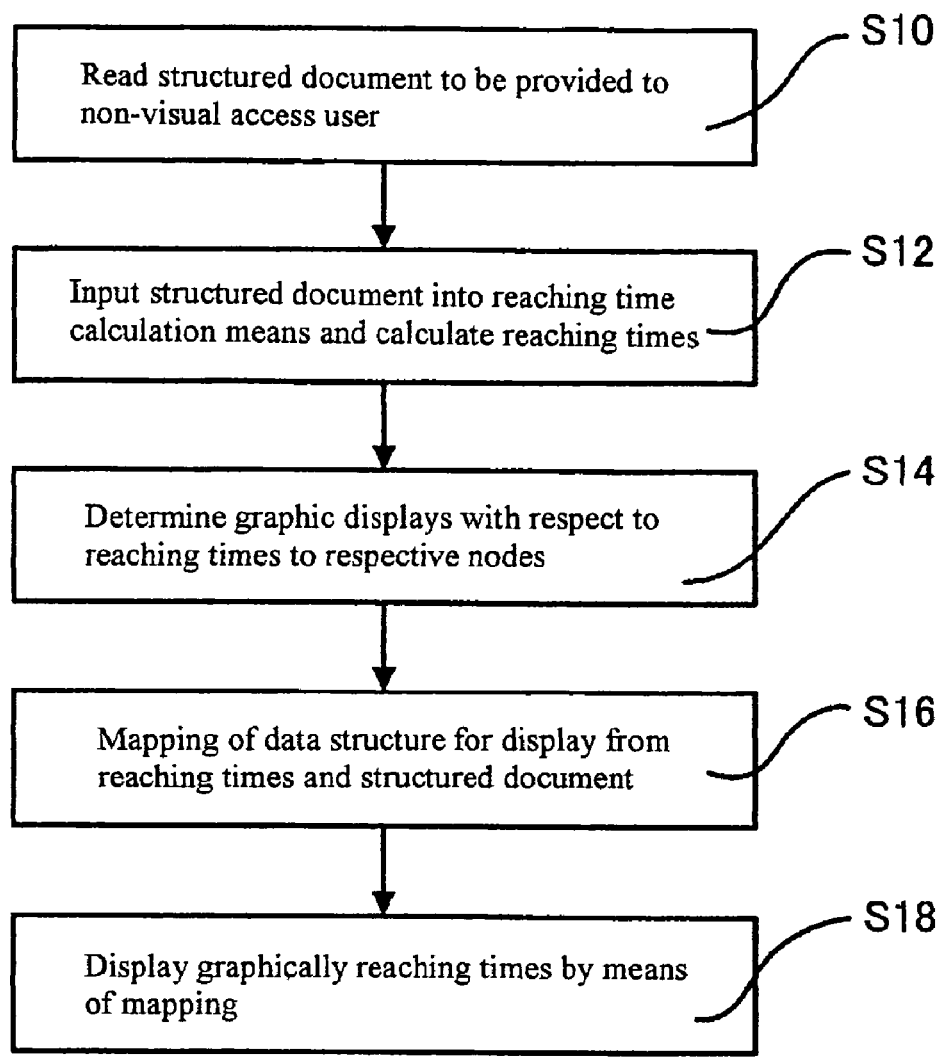
FIG. 1 is a schematic flowchart of a content creation method of the present invention.

Though the present invention will be described below with reference to specific embodiments shown in the drawings of the present invention, the present invention is not limited to the specific embodiments as will be described below. FIG. 1 shows a schematic flowchart of a content creation method of the present invention. The content creation method of the present invention reads a content to be displayed with respect to a non-visual access user, from appropriate storage means, for example a database, at step S10. In the present invention, though the content may be written in various kinds of structured languages such as HTML, DHTML, XML and SGML, the content will be described below as written in DHTML as one particular embodiment, in order to describe the present invention specifically. A read structured document is inputted into reaching time calculation means at step S12, and a reaching time to a predetermined node is calculated from nodes in the structured document acquired based on tags, identifiers and the like, and links up to the nodes and the like. In the described embodiments of the present invention, the reaching time calculation means calculates the time until voice synthesis of the acquired nodes is executed, from, for example, data such as a normal speech speed used by particular voice synthesis software or a normal conversation speed, the number of words up to the predetermined node and the like. The acquired reaching time is stored temporarily in an appropriate storage area.

At step S14, the method determines display formats in response to the calculated reaching times with respect to the acquired nodes by receiving a command from a creator. More particularly, in the present invention, as the command inputted by the creator which is illustrated in pseudo code, in order to specify a color, it is possible to input "get color [ ]" to enable to input a color code, and then "#000000" (black) to specify the color. Though, in addition to the above, such commands include those for specifying the display formats such as gray scale, half-tone dot meshing, brightness and text display, the present invention is not limited to the above described embodiments. In addition, in the present invention, it is possible to register a normal display format previously. Next, a process of the content creation method continues with step S16, where it reads the nodes, the reaching times for the respective nodes, and the structured document into conversion means, maps the nodes, the reaching times and display positions of the nodes on a screen specified by the structured document to create a time display mapping table, and stores it in the appropriate storage area. This time display mapping table is used in order to assign the display formats with respect to display regions of the nodes on a web page on the screen.

Subsequently, at step S18, the method displays the web page in which the reaching times are reflected, by means of browsing means, and gives the web page creator visually the reaching times to the nodes. Thereby, the method makes accessibility for voice browsing with respect to the non-visual access user comprehensible visually.

Figure 2:
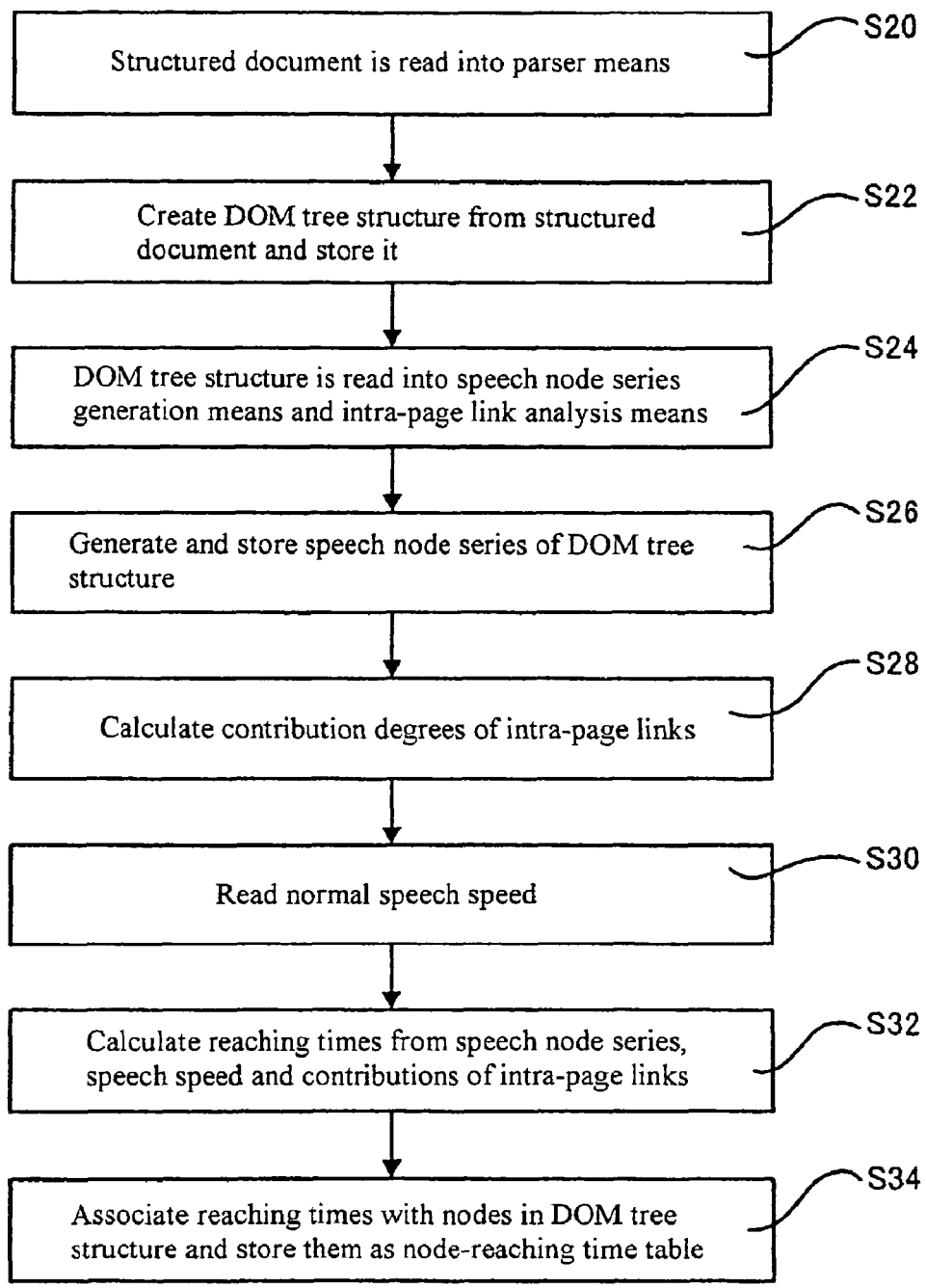
FIG. 2 is a flowchart showing a process in a reaching time calculation section of the present invention.

FIG. 2 shows a schematic flowchart of a process executed by the reaching time calculation means of the present invention. The reaching time calculation means of the present invention causes the targeted structured document to be read into parser means, at step S20. At step S22, the reaching time calculation means acquires a DOM (Document Object Model) tree structure from the read structured document, and stores the acquired DOM tree structure in the appropriate storage area. It should be noted that as the DOM which may be used in the present invention, in addition to those in specifications of various kinds of browser software such as Netscape Navigator® or Internet Explorer®, those which are adapted to a specification given by W3C may be used.

Next, at step S24, data of the stored DOM tree structure is read into speech node series generation means and intra-page link analysis means. At step S26, the speech node series generation means sorts the nodes in the DOM tree structure in appropriate order, generates a speech node series to be inputted into the voice synthesis software and stores it in the appropriate storage area. At step S28, the tags for specifying intra-page links are analyzed, and then degrees of contributions of existences of the intra-page links to the reaching times are calculated, for example, in consideration of effects such as a jump or a skip by means of the links, and they are stored in the appropriate storage area.

At step S30, the stored speech node series and the contribution degrees of the intra-page links are read from the storage area, and simultaneously the speech speed normally used by the voice synthesis software, the conversation speed obtained experimentally, and the like are read, for example, from the storage area. At step S32, the reaching times with respect to respective predetermined nodes in the given speech node series are calculated. At step S34, the acquired nodes are associated with the reaching times with respect to the nodes, and they are stored, for example, as a node reaching time table, in the storage area.

Figure 3:
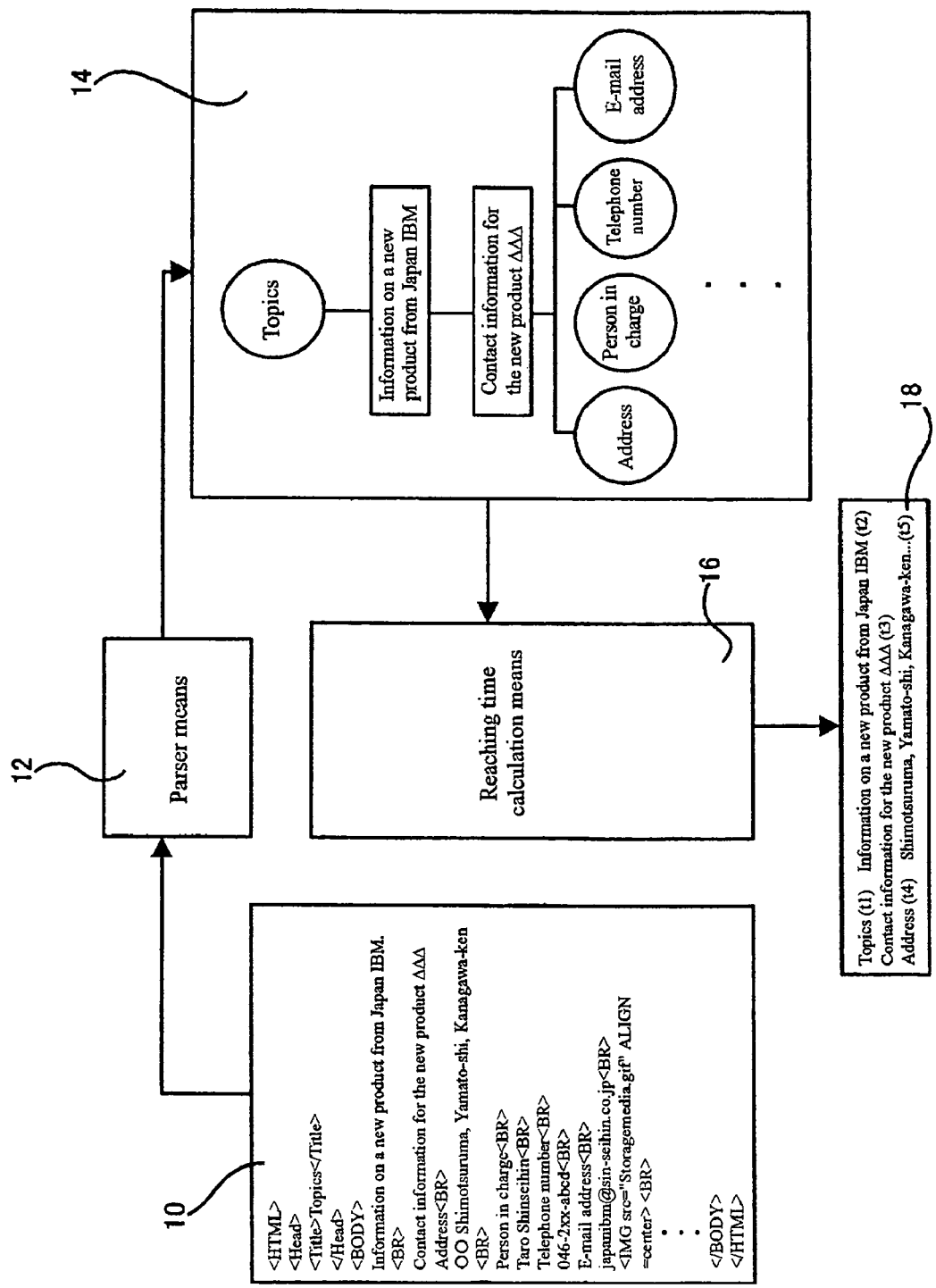
FIG. 3 shows an embodiment of a structured document and a schematic embodiment for creating a node reaching time table in the present invention.

FIG. 3 shows an embodiment of the structured document and a schematic embodiment for creating the node reaching time table in the present invention. In FIG. 3, the structured document is described as DHTML. The DHTML document 10 shown in FIG. 3 is read and parsed by parser means 12, and a DOM tree structure 14 is generated. With respect to the nodes acquired in the DOM tree structure 14, the reaching times for the respective nodes are calculated in reaching time calculation means 16 in the present invention, by using the normal speech speed read from a memory such as the appropriate memory, a RAM and a ROM. The calculated reaching times for the respective nodes, for example, t1 to t5, are registered so as to correspond to the nodes in the DOM tree structure 14, and a node reaching time table 18 is generated and stored in the appropriate storage area.

Figure 4:
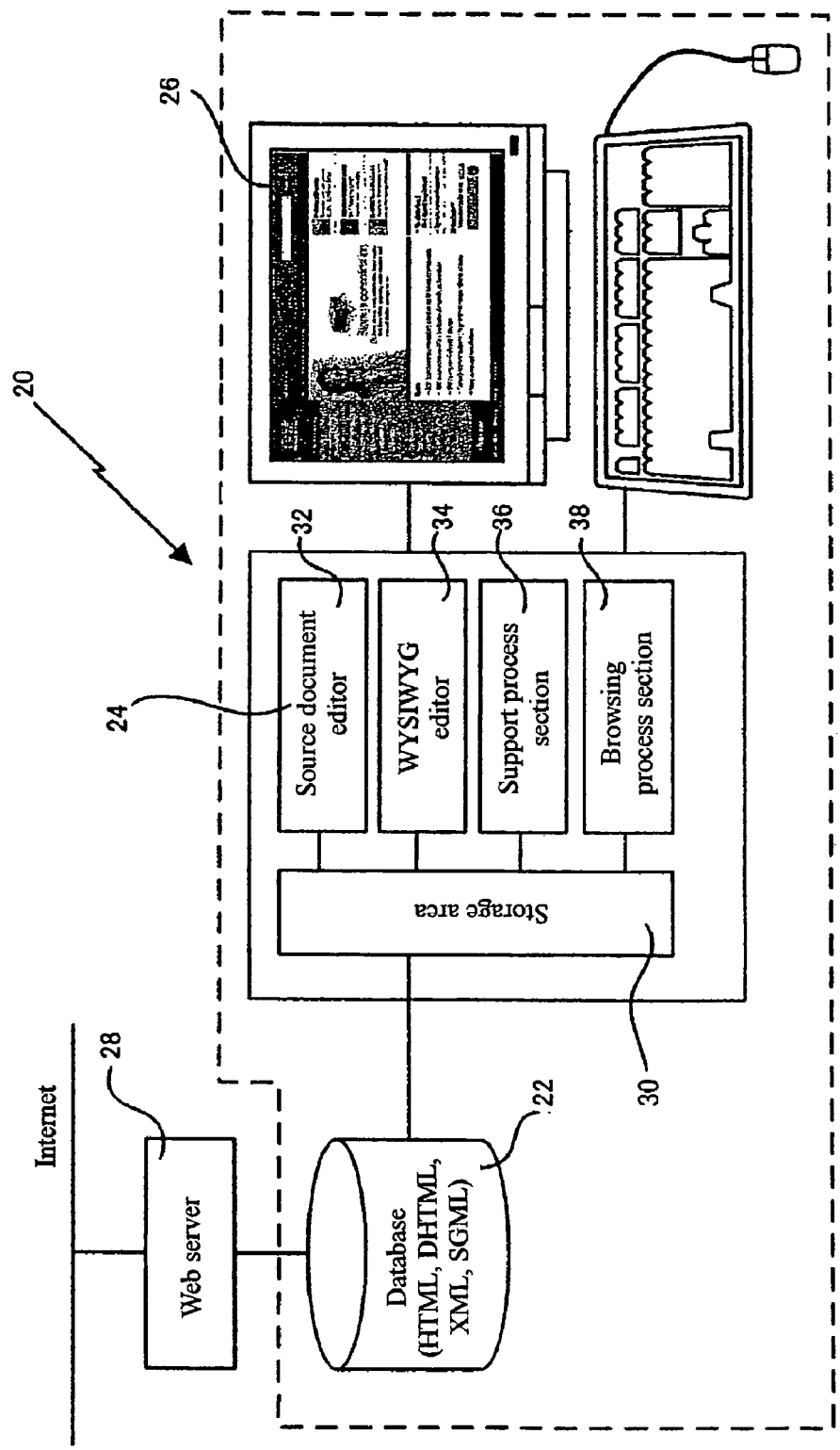
FIG. 4 shows a schematic functional block diagram of a content creation system of the present invention.

FIG. 4 shows a schematic functional block diagram of a content creation system of the present invention. As shown in FIG. 4, the content creation system 20 of the present invention includes a database 22 having stored the structured document written generally in HTML, DHTML, XML and SGML, an information process section 24 for creating the web page of the present invention, and a display section 26 provided with a screen for displaying the created web page and the reaching time to an element word in case of using the voice browsing, with respect to the web page creator. In the present invention, the above described information process section may be configured as a computer including a storage area, a central processing unit (CPU), an input/output interface and the like.

In addition to the structured document, the database 22 further has stored image data, audio data and the like for generating the content to be provided as the web page, and in response to a request from the user, sends the content to the user via a web server not shown, for example, via a network such as the Internet. Furthermore, it is possible to embed various kinds of links such as JSP, Servlet, Applet and CGI in the structured document, so as to provide a WYSIWYG function with respect to the user. The content creation system 20 of the present invention as shown in FIG. 4, in the described embodiment, is configured separately from the web server, and described as a dedicated processing device for supporting the creation or edit of the web page for itself. However, the content creation system 20 of the present invention may be included in the web server 28, as a partial function of the web server 28.

The information process section 24 as shown in FIG. 4 further includes a memory area 30 including the appropriate memory, a hard disk and the like, a source document editor 32, a WYSIWYG editor 34, a support process section 36 and a browsing process section 38. The storage area 30 stores temporarily the structured document stored in the database 22, and also stores results of processes executed by various kinds of functional blocks temporarily or for as long as required.

The source document editor 32 is configured as a software block which may create and edit the structured document such as HTML, DHTML, XML and SGML, for example. The WYSIWYG editor 34 enables to use the various kinds of links written in the structured document to link the image data, the audio data, other documents and the like, and then create and provide the content in a format desired by the user.

The browsing process section 38 reads the structured document temporarily stored from the storage area 30, and displays the content created with reference to the WYSIWYG editor 34 on the screen of the display section 26. The creator recognizes visually the content displayed on the screen, and creates or edits the content interactively.

Furthermore, the support process section 36 in the present invention has a support function with respect to the creator for visualizing the accessibility for the non-visual access user. The support process section 36 reads and analyzes the structured document from the storage area 30 to acquire the nodes in the DOM tree structure, and uses the normal speech speed and the like to estimate the times until the nodes are spoken as synthetic voices by the voice synthesis software and the like installed at a user's terminal. In this case, if the support process section 36 may use the same voice synthesis software as that of the user's terminal, the reaching times may be estimated more precisely.

As will be further described below, the support process section 36 uses the nodes, the reaching times calculated for the respective nodes and display positions on the screen to execute the mapping, generates the time display mapping table and stores it in the storage area 30.

Figure 5:
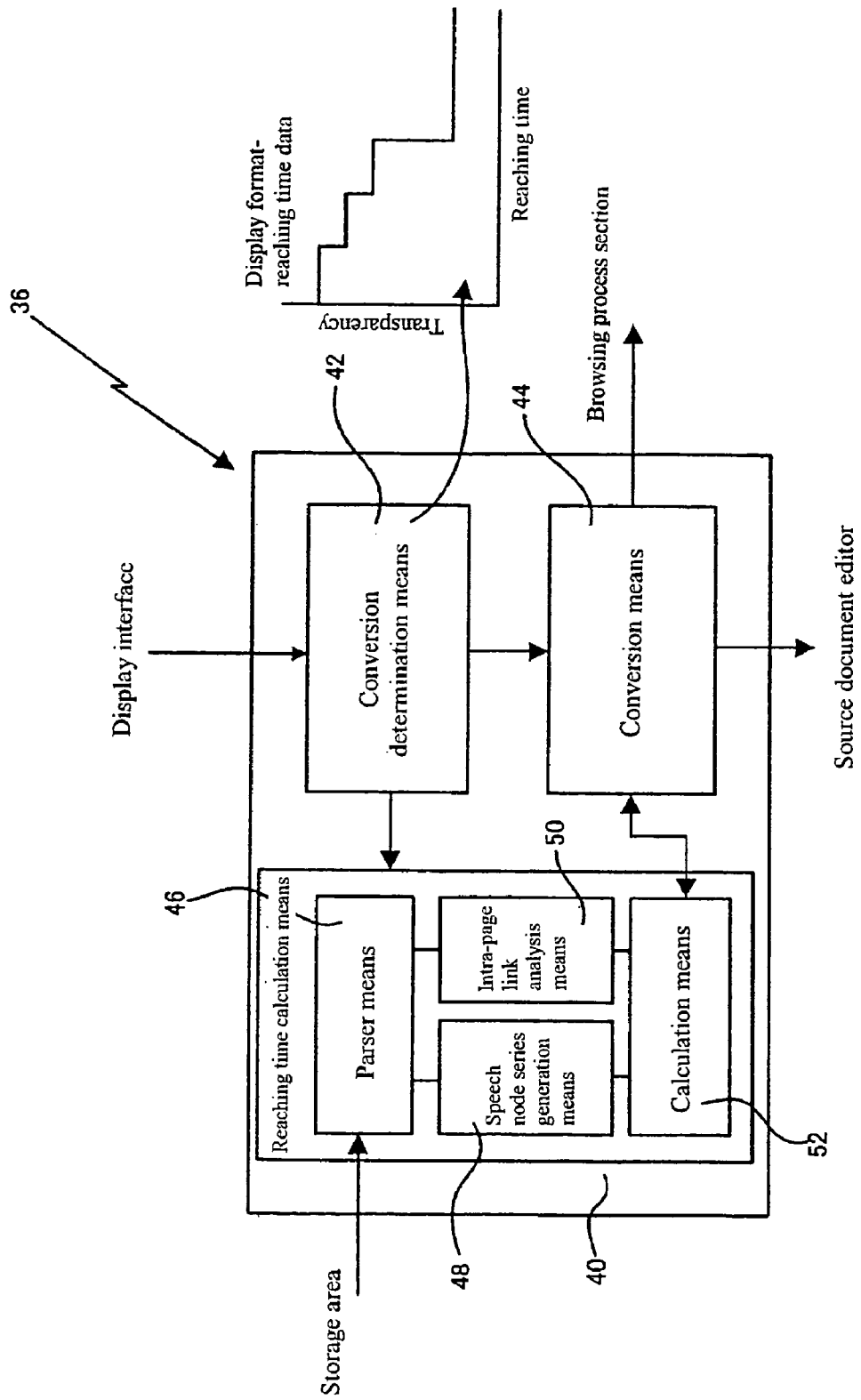
FIG. 5 shows detailed functional blocks of a support process section of the present invention.

FIG. 5 shows detailed functional blocks of the support process section 36. As shown in FIG. 5, the support process section 36 includes reaching time calculation means 40, conversion determination means 42 and conversion means 44. Furthermore, the reaching time calculation means 40 includes parser means 46, speech node series generation means 48, intra-page link analysis means 50 and calculation means 52. The reaching time calculation means 40 first reads the structured document from the storage area 30, parses it in the parser means 46, acquires the nodes in the structured document, generates the DOM tree structure as a node hierarchy structure, and stores it in the appropriate storage area 30. The speech node series generation means 48 reads the generated DOM tree structure to extract the nodes, sorts the order of the node series by means of a predetermined criteria to create the speech node series, and stores it in the appropriate storage area 30. On the other hand, the intra-page link analysis means 50 determines an intra-page link structure in the structured document, calculates necessary times with respect to the links which contribute to the speech node series, and stores them in the storage area 30.

The calculation means 52 reads the generated speech node series and the contributions of the links from the storage area 30, as well as the normal speech speed used by the voice synthesis software from, for example, the memory or the storage area 30, and then calculates the time from starting the voice synthesis until the voice synthesis of the node is executed, that is, the reaching time. The calculated reaching times for the respective nodes are stored as the above described node reaching time table by storing them with the corresponding nodes respectively in the storage area 30.

The conversion determination means 42 determines a display mode and the display format for displaying the reaching time for each node graphically. In the present invention, displaying the reaching time in a different mode in case of displaying the reaching time on the screen is referred to as the display mode, and a visual format such as gradation and display color with respect to the reaching time in a predetermined display mode is referred to as the display format. In addition, the conversion determination means 42 receives a command for instructing the display mode, a command for instructing the display format, a modification command for instructing to modify the reaching time (reaching time modification command) and the like, which are inputted by the creator, and causes the reaching time calculation means 40 and the conversion means 44 to execute the processes corresponding to the respective commands respectively.

Furthermore, in one particular embodiment of the present invention, the conversion determination means 42 may include display format-reaching time association data. The display format-reaching time association data may be configured as a table, in which transparency is 100% until a predetermined reaching time and the transparency is decreased as the reaching time becomes late, or in which luminosity of the display color is lowered gradationally, or the like. In FIG. 5, the above described embodiment of the display format-reaching time association data is shown as a graph of the reaching time and the transparency.

The conversion means 44 acquires a screen region for displaying in a selected display mode, that is, from the display position of the first node in the structured document beginning with an identifier, for example, a <Body> tag, in the structured document, to the display position of the last node to be displayed. Simultaneously, the conversion means 44 receives the command for specifying the display format from the conversion determination means 42, and acquires the gradation with reference to the time display mapping table so that the corresponding node may be displayed, for example, in the gradation defined by the reaching time of the node. In this phase, by reading the node reaching time table previously created and registered and using a node identifier attached to the node and the like as a key, the conversion means 44 maps the node, the reaching time and the display position to create the time display mapping table.

Subsequently, the conversion means 44 executes a process for inserting necessary tags with respect to the structured document to create an edited structured document and stores it, for example, in the storage area 30. This edited structured document is regarded as transient data to be used when a voice browsing function is given in the content creation, and is used in order to determine the accessibility for the non-visual access user through the voice synthesis.

The edited structured document which is inserted with the identifier corresponding to the display mode, is inputted in the browsing process section 38. Then the accessibility to the web page, for example, in the case of executing the voice browsing in a pseudo fashion on the screen of the display section 26 by the browsing process section 38, is displayed with respect to the web page creator who is a visual access user. It should be noted that the edited structured document created in the present invention may also be created as the structured document in which only tags for giving appropriate display formats are written, and in this case, the display by means of the edited structured document may also be overlaid and displayed on the display of the original structured document being processed at that time. It should be noted that the display position in the present invention may be represented with position coordinates on the screen or in units of cursor movements for executing the display.

Figure 6:
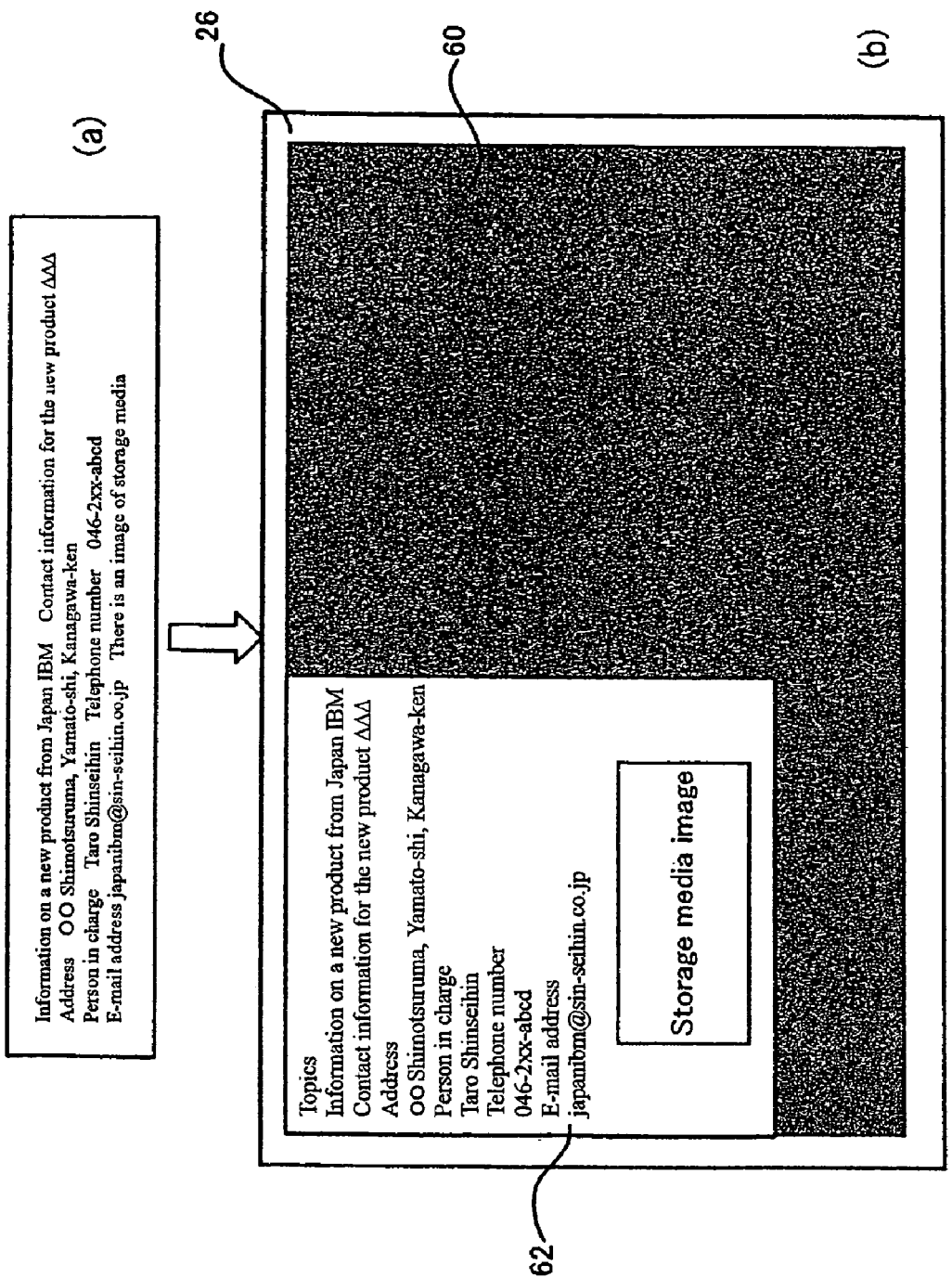
FIG. 6 shows a data structure of a set to be used in a reaching time-display position mapping, and a display corresponding thereto on a screen in the present invention, in the case of using a DHTML document as shown in FIG. 3.

FIG. 6 shows a data structure of a set to be used in the reaching time-display position mapping as described above, and the display corresponding thereto on the screen, in the case of using the DHTML document as shown in FIG. 3. FIG. 6(*a*) shows an embodiment of the speech node series, and FIG. 6(*b*) shows a schematic embodiment of a screen display displayed by the present invention. As shown in FIG. 6(*a*), though the speech node series has few words since a relatively simple DOM tree structure is used, for example, it is assumed that the voice synthesis software executes the voice synthesis of an E-mail address "japanibm@sin-seihin.co.jp". In addition, it is assumed that the gradation in this range is given the gradation of the transparency of 100% by the conversion determination means. FIG. 6(*b*) shows a screen 60 of the display section 26 and a node 62 displayed on the screen 60.

As shown in FIG. 6(*b*), in the voice synthesis, the node of which the voice synthesis is executed at the predetermined reaching time, is given black gradation so that the node is shown to be hidden. On the other hand, the node of which the voice synthesis is completed before the predetermined reaching time, is not given any gradation so that the node is shown clearly. Shading on the screen corresponds to the time until the non-visual access user acquires the information for external use. Therefore, as shown in FIG. 6, according to the present invention, with respect to the nodes displayed all over the screen, it may be possible to recognize visually which time the non-visual access user acquires the targeted voice synthesis at, as a black region being large or small.

In addition to the above, in another embodiment of the present invention, if comprehensibility of speech order of the content is improved and a page index is used to divide the page into a plurality of regions, it is possible to employ a configuration which facilitates determination with respect to which intra-page link affects which element. Specifically, for example, it is also possible to use an embodiment in which a relation between the intra-page links and the content is displayed on the screen and a portion between the intra-page links in the page is displayed to be separated by color as "meaningful block of contents". In this case, the gradation may not be colored black but may be colored differently for the respective regions of "meaningful block of contents", and also a boundary portion between the regions may be displayed with a line.

In addition, in yet another embodiment of the present invention, in addition to a method of using the colors or the gradation of colors, it is also possible to use a visualization method as will be described below, or to combine these methods properly and use them. A specific embodiment of the visualization method will be described below more particularly.

Figure 7:
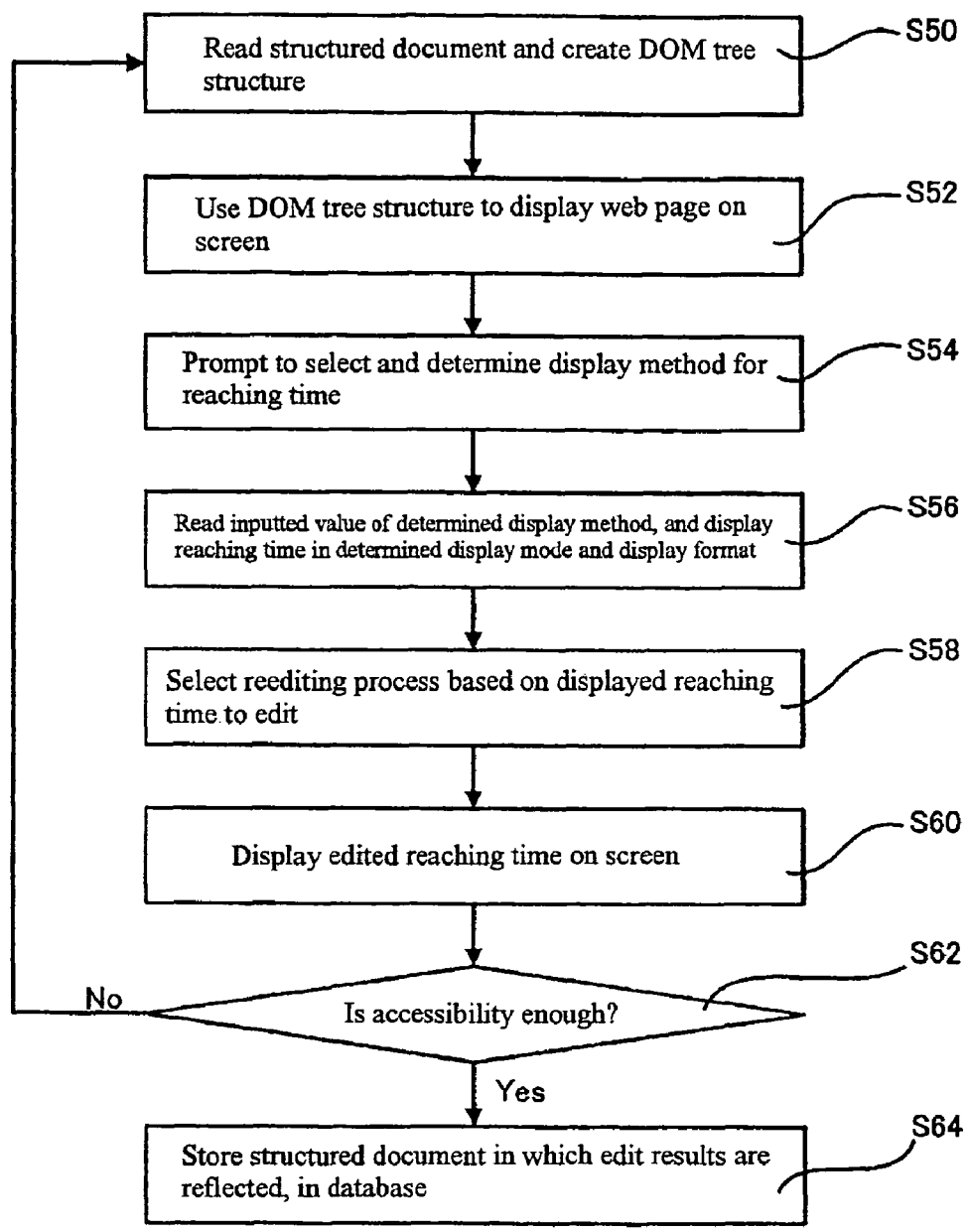
FIG. 7 shows a schematic flowchart of a web page creation support method of the present invention.

FIG. 7 shows a schematic flowchart of a web page creation support method of the present invention. The web page creation support method of the present invention as shown in FIG. 7, reads the structured document such as DHTML from the database and generates the DOM tree structure in the parser means at step S50. At the step S52, the method displays the web page given via HTML by using the generated DOM tree structure, on the screen of the display section.

At step S54, the method causes the creator to input a signal for selecting the display mode or the display format of the reaching time. To this end, for example, when a menu is displayed by clicking "Modification simulation" menu given as a tool bar, and the creator selects "Reaching time to main", a corresponding command is sent to the conversion determination means.

The method of the present invention next continues with a process of step S56, where it determines the display mode or the display format from the inputted command, and displays the edited structured document created by the conversion means on the screen to display the reaching time. At step S58, based on the displayed reaching time, for example, when the creator selects "Reedit" from a menu bar, a reedit command is sent to the conversion determination means to cause the information process section to start a reediting process. When the information process section receives the reedit command, it starts to execute the reediting. As one specific embodiment of the reediting process, for example, it is also possible to instruct to start the source document editor and edit directly the structured document being displayed at that time to insert the link to a main content.

In addition, in the present invention, in consideration of the reaching time being determined mainly by the speech node series, it is also possible to read the speech node series and the structured document from the memory area 30 into the source document editor, then insert a string "Do you want to stop speaking the following and jump to the main content?" including the link to the main content, with respect to the speech node series, and simultaneously insert the link at the corresponding position in the structure document. If there are the intra-page links as described above, the links are sorted so that the order of the node corresponding to the content of a link destination in the speech node series corresponds to the position in the structured document.

At step S60, the method displays the edited structured document on the screen and displays the reaching time graphically, and at step S62, it repeats the above described process until it receives the command inputted by the creator indicating that the accessibility has been satisfied. The signals indicating that the accessibility has been satisfied, in the present invention, may include an end edit command (E), a store command (S) and the like, or the commands for giving equivalent functions corresponding to the above described commands. At step S64, the method stores the edited DHTML document in the database and the like and enables to provide the web page having the improved accessibility for the non-visual access user.

Figure 8:
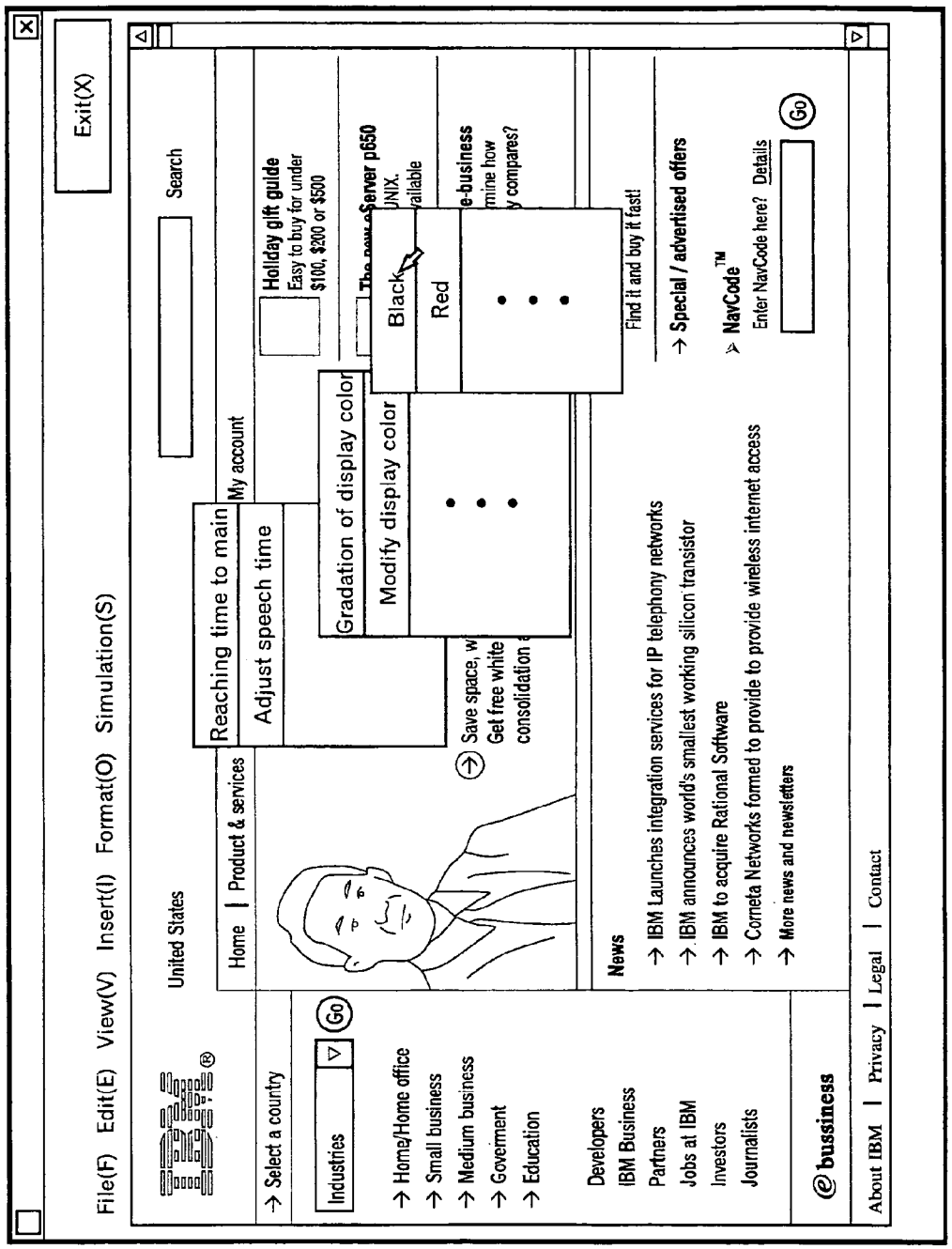
FIG. 8 shows an embodiment for displaying graphically a menu for selecting or determining a display format in the present invention.

FIG. 8 shows the display of a menu for selecting or determining the display format according to the processes at steps S52 and S54. As shown in FIG. 8, at step S54, when the creator clicks "Modification simulation" menu and inputs, the conversion determination means displays a modification menu. Then, if the creator selects "Reaching time to main", a pop-up menu is displayed for selecting the display format from "Gradation of display color" and the like. Furthermore, if the creator selects "Gradation of display color", then menu items for inputting "Color selection" are displayed and the command for determining the display format is sent to the conversion determination means.

Figure 9:
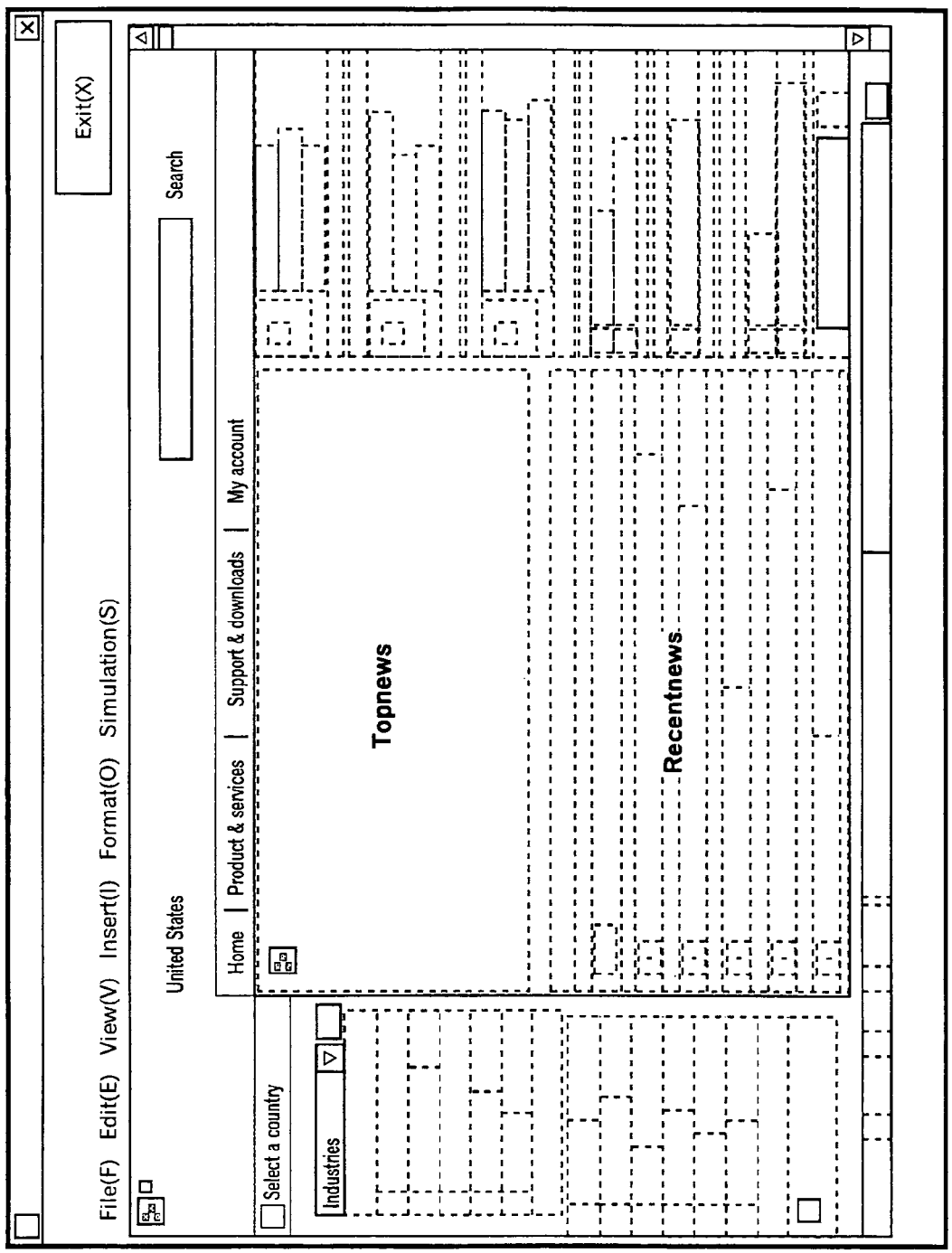
FIG. 9 shows an embodiment of a graphical display of the reaching time to a predetermined element word of the present invention.

FIG. 9 shows an embodiment of a graphical display of the reaching times to the predetermined nodes to be displayed if the process at step S56 of the method of the present invention is selected by the creator in a procedure as shown in FIG. 8. In FIG. 9, the reaching times to the respective nodes are calculated in a sequential order, in the case where the page is spoken by means of a voice browser (voice processing software such as a home page reader) from its beginning. In FIG. 9, the reaching times to the respective nodes are displayed by changing the gradations of the respective nodes. In the embodiment shown in FIG. 9, black is selected as the display color and it is shown that the darker the black color becomes, the longer the reaching time becomes.

Since FIG. 9 does not have "Direct link to main", for example in FIG. 9, the most important information Topnews and Recentnews are located in the middle of the page, and the accessibility for the voice browsing in such a case is shown. In FIG. 9, since the Topnews and the Recentnews are arranged backward in the speech node series, the main content is shown in the darkest gradation which shows that the accessibility thereto is not enough. As shown in FIG. 9, by using a graphic display of the present invention, it is possible to check visually which portion is most difficult to access among portions displayed on the screen.

Figure 10:
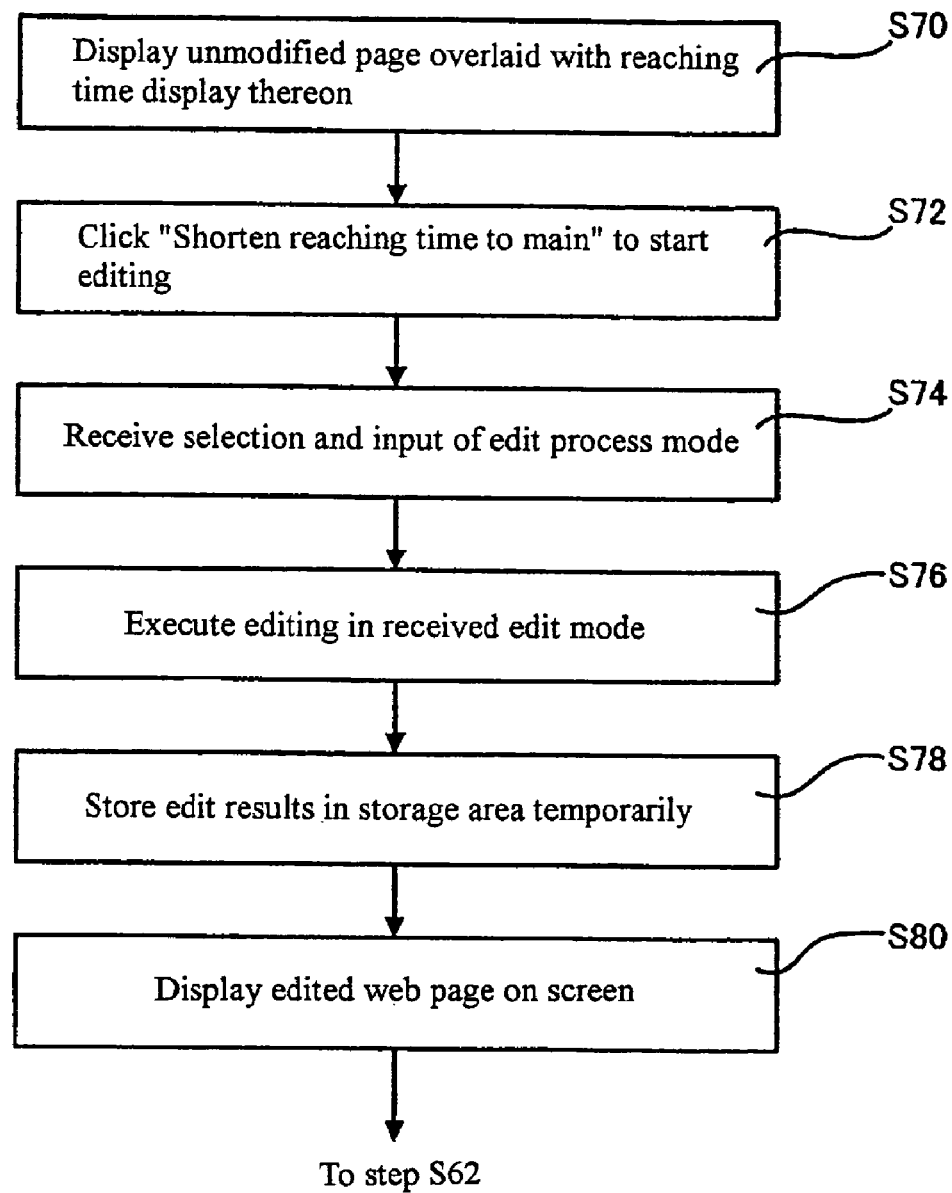
FIG. 10 is a flowchart of an exemplary procedure of an edit process for the structured document in the web page creation support method of the present invention.

FIG. 10 shows a flowchart of an exemplary procedure of an edit process for the structured document in the web page creation support method of the present invention as shown in step S58. The embodiment shown in FIG. 10 illustrates the edit process for the creator or a manager to improve the accessibility for the non-visual access user without modifying the web page significantly. In the process of the content creation method of the present invention as shown in FIG. 10, the information process section first reads the structured document such as DHTML and displays it at step S70. Next at step S72, the creator selects "Modification simulation" menu arranged on the screen of the display section, and then selects "Shorten reaching time to main".

In the above described process at step S72, it is possible to have registered in a field of "Shorten reaching time to main", for example, a command for editing the speech node series "edit speech node series [ ]", or a command for editing the structured document "edit source document [ ]", which are illustrated in pseudo code. Thereby it is possible to edit the speech node series or to edit DHTML directly, as intended by the web page creator.

At step S74, the process displays the reaching time on the screen, and waits for the creator to select and input the edit process prepared previously. At step S74, the edit process prepared previously may include a process of inserting the link at the beginning of the web page so that the voice synthesis of the element word giving the link to the targeted main content is executed first, a process of creating the page index, and the like. However, in the present invention, any edit process may be employed as long as it is possible to improve the reaching time to the main content.

For example, the edit process, with respect to an ALT attribute for explaining to the non-visual access user about the content such as image data, which is unrecognizable for the non-visual access user even if it is presented, may include the edit process for retrieving and extracting the node in the case where the link to the image data without the ALT attribute is given therein, the node in the case where unnecessary ALT attribute is attached to a spacer image, the node in the case where the ALT attribute provided may cause inappropriate readings or confusion with respect to the non-visual access user, and the like, to display them on the screen and the like.

Next, the content creation method of the present invention continues with the process at step S76, where the method starts the source document editor, receives the input from the creator, executes the edit process in response to the input, creates the edited structured document and stores it in the appropriate storage area at step S78. At step S80, the method displays the edited structured document on the screen via the browsing process section, and returns the process to step S62 of FIG. 7, where it enables to reedit the structured document, depending on whether edit results are reflected on the web page or whether the edit results may give enough accessibility or not.

Figure 11:
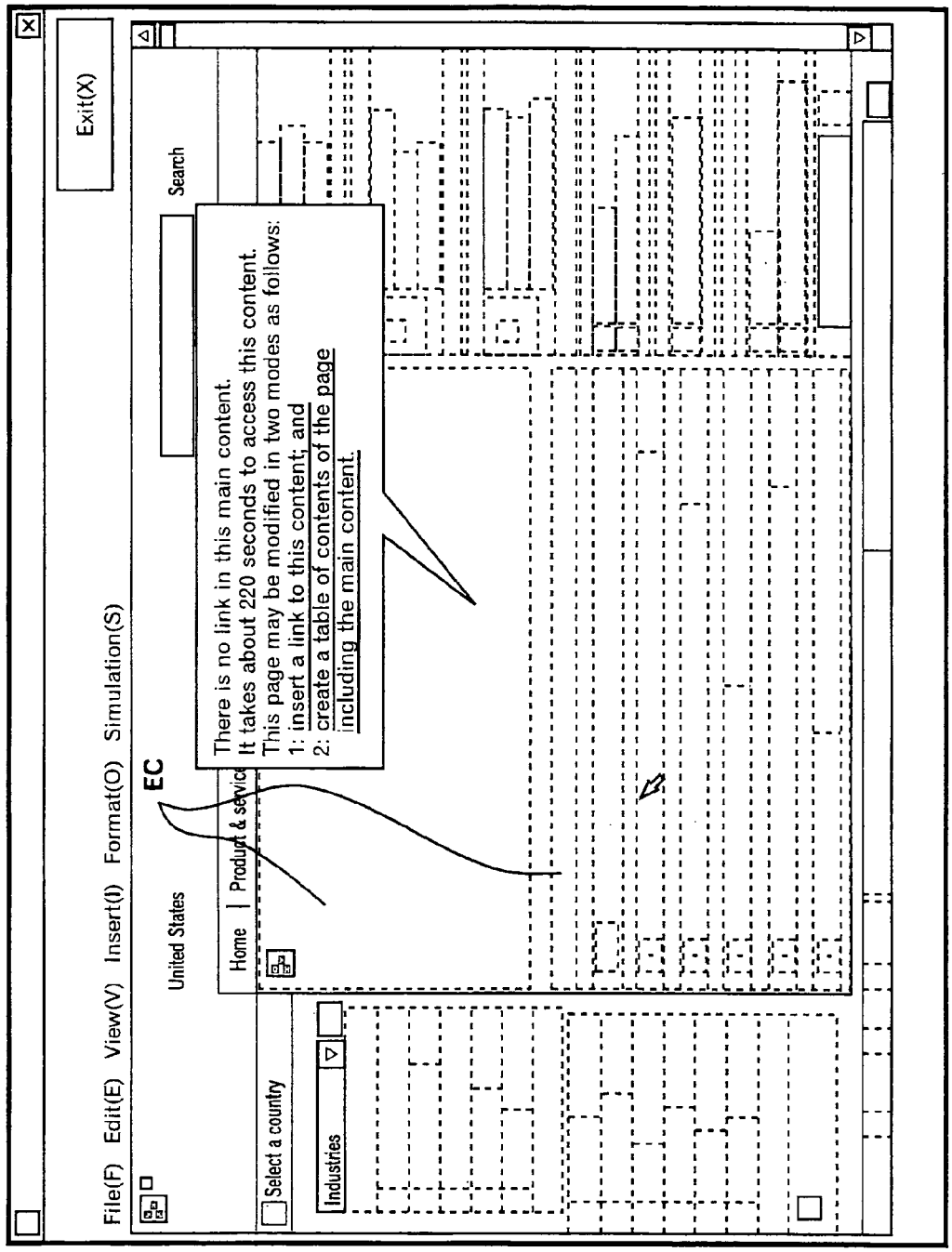
FIG. 11 shows an embodiment of a graphical user interface to be displayed on the screen of a display section by the content creation system of the present invention, by executing the content creation method of the present invention as explained in FIG. 10.

FIG. 11 shows an embodiment of a graphical user interface to be displayed on the screen of the display unit by the content creation system of the present invention, by executing the content creation method of the present invention as explained in FIG. 10. In FIG. 11, since the web page has not been processed at all in order to improve the accessibility, and the reaching times are arranged in order of the speech node series, the element word for enabling the link to the main content is arranged in the region which is filled with black indicating that the reaching time is late, for example, the region shown with a reverse color reference character EC.

Then, the content creation method of the present invention, as shown in FIG. 11, displays a message as follows: "There is no link at the beginning of this page. Thereby it takes about 220 seconds to access a link to this main content. This page may be modified by two methods as follows:
1: insert a skip-to-main link; and
2: create a page index (table of contents)."

Figure 12:
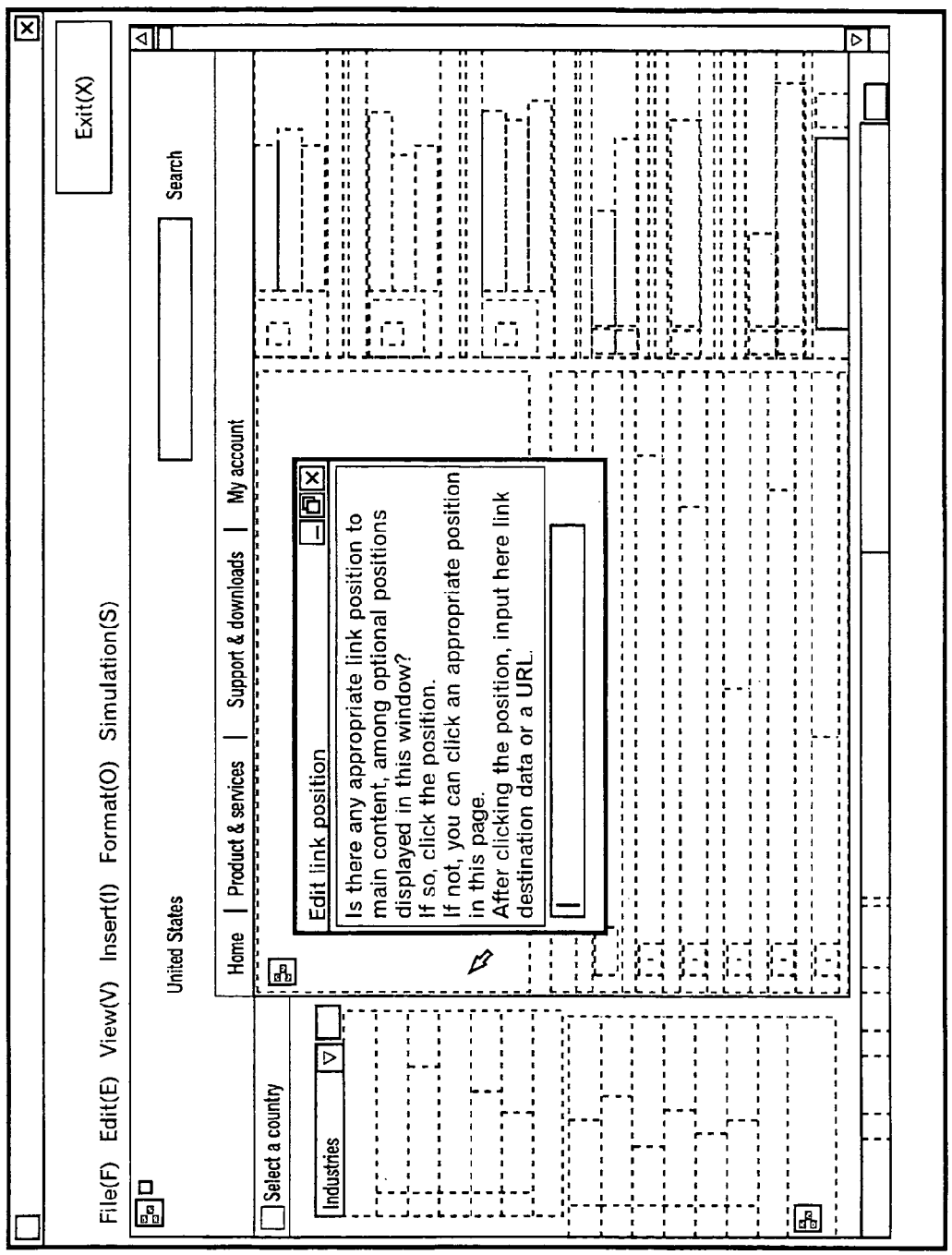
FIG. 12 shows a screen display in the case where a creator selects to create a link for editing.

FIG. 12 shows the screen display in the case where the creator selects 1 for editing. In FIG. 12, the creator desires to edit by inserting the link to the main content. In this case, the content creation system in a particular embodiment of the present invention selects a plurality of appropriate link positions automatically with reference to the time display mapping table corresponding to the structured document being processed at that time and the like. Subsequently, the system modifies colors and highlights of display fields of backward nodes corresponding to the selected link positions, and displays them to the creator. In the embodiment shown in FIG. 12, the information process section analyzes the time display mapping table and the like to present options for the position of the main, for example, displays the fields of the backward nodes in a reverse color.

Simultaneously, the information process section displays a message on the screen of the display section as follows: "Is there any appropriate main start position? If so, click the position. If not, click an appropriate main content link position in the page". Then the information process section is controlled in a state for waiting for the creator to input, for example, "click" and the like. Subsequently, for example, the screen display such as "Input link destination data or a URL address." is shown, and the fields for inputting link destination data or a URL address are displayed as pop-up.

When the creator clicks the display position of the predetermined node on the display screen as shown in FIG. 12, the information process section acquires the node corresponding to the position on the screen, and then inserts a statement for instructing to execute the skip-to-main link, for example, "skip the following explanation and view the main content" with respect to the speech node series, immediately prior to a descriptive position of the acquired node in the structured document, and simultaneously inserts a link command for enabling the link, the link destination data, the URL address and the like, immediately prior to the corresponding node in the structured document. Using the above described process enables to insert the link at an appropriate reaching time as well as prevent the creator from missing a description of the link destination and the like.

In addition, in the present invention, the creator may specify the display position of the main content and insert the corresponding link to the main content by dragging and dropping the main content at a desired position. Moreover, as a result of the above described editing, it is also possible to have implemented the voice synthesis software in the information process section and execute speaking of the speech node series, in order to check that the result has been reflected in the synthetic voice actually.

Figure 13:
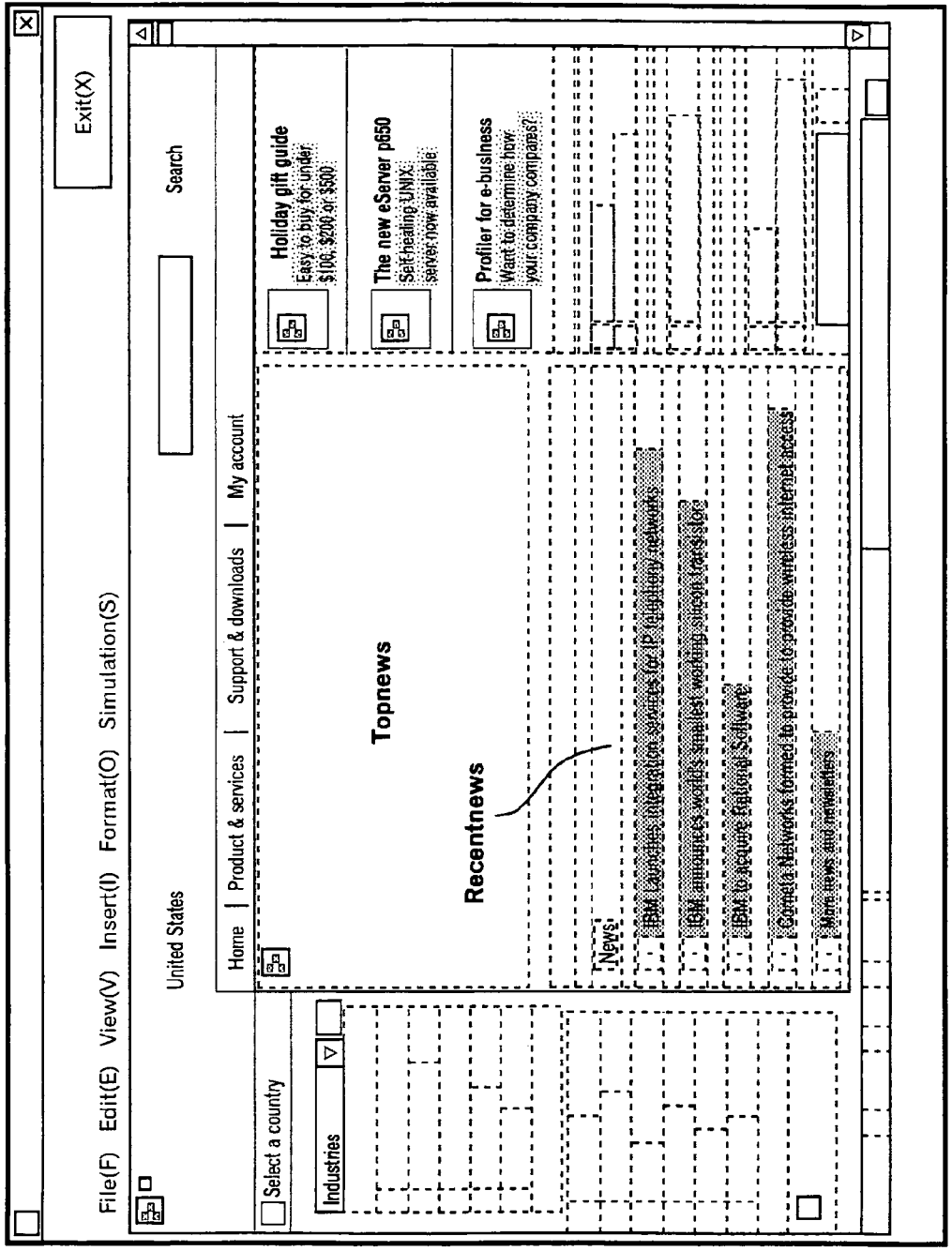
FIG. 13 shows an embodiment of a graphic display for displaying graphically the reaching times of a web page in which an appropriate link to a main content has been created, according to the present invention.

FIG. 13 shows an embodiment of the graphic display for displaying graphically the reaching times of the web page in which an appropriate link to the main content has been formed. As shown in FIG. 13, as a result of editing the Topnews and the Recentnews according to the present invention, they are improved in the accessibility and shown in lighter gradations. As shown in FIGS. 11 to 13, it may be possible for the creator to create interactively the content in which inappropriate ALT attribute settings and the accessibility to an important main content are improved, while checking the accessibility on the screen.

Figure 14:
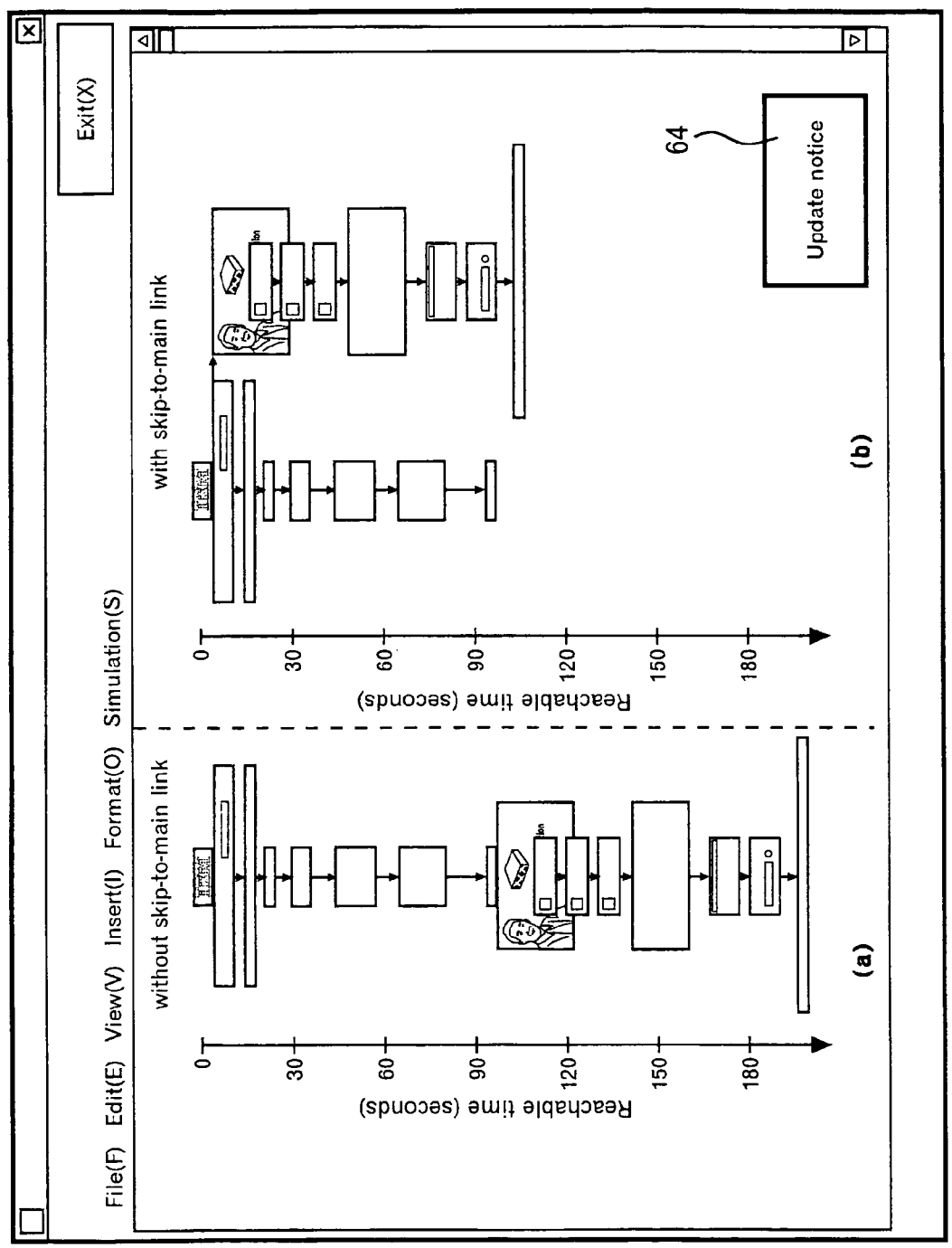
FIG. 14 shows an embodiment of another display mode of the reaching times which may be employed in the web page creation support of the present invention.

FIG. 14 shows an embodiment of another display mode of the reaching times which may be employed in the web page creation method of the present invention. The display mode shown in FIG. 14 extracts the nodes, the image data, the URL addresses or the likes to be displayed for the respective nodes, arranges the corresponding reaching times and the extracted screen displays in time series, and shows them. In the display mode shown in FIG. 14, a time axis is assigned to a vertical axis, and various kinds of intra-page links are represented as branches of a tree, so that they are represented as height and width of the tree.

In addition, the reaching times shown in FIG. 14(a), in which the information is arranged in a line since "skip-to-main link" does not exist, are the reaching times to the nodes in the structured document which has not been edited yet, for example. On the other hand, FIG. 14(b) shows the reaching times in the case where the link to the main content is given according to the present invention, and the link is inserted. As shown in FIG. 14(b), the accessibility including the link for the user to the Topnews or the Recentnews may be displayed in real time, and furthermore, the accessibility including the branch on the way for the non-visual access user may be checked more visually.

In addition, in another embodiment for visualizing the reaching times with the graphical user interface of the present invention, it will be also necessary to execute visualization display of "unreached regions" which the non-visual access user may not reach. In the present invention, the above described unreached regions may be displayed either by displaying the regions which the non-visual access user has already reached with the gradation, or by displaying the unreached regions in another color. Moreover, it is possible to arrange areas of the unreached regions separately, without displaying them on a time tree as described in FIG. 14. For example, in the present invention, an infinity box 64 may be arranged indicating that the box may not be reached apparently in time series. In the present invention, a configuration may be employed in which an unreachable node is displayed within the infinity box 64. In FIG. 14(b), the infinity box 64 is arranged at the lower right end with respect to FIG. 14(b) as shown, and the unreachable node, for example, "Update notice" is displayed therein.

Figure 15:
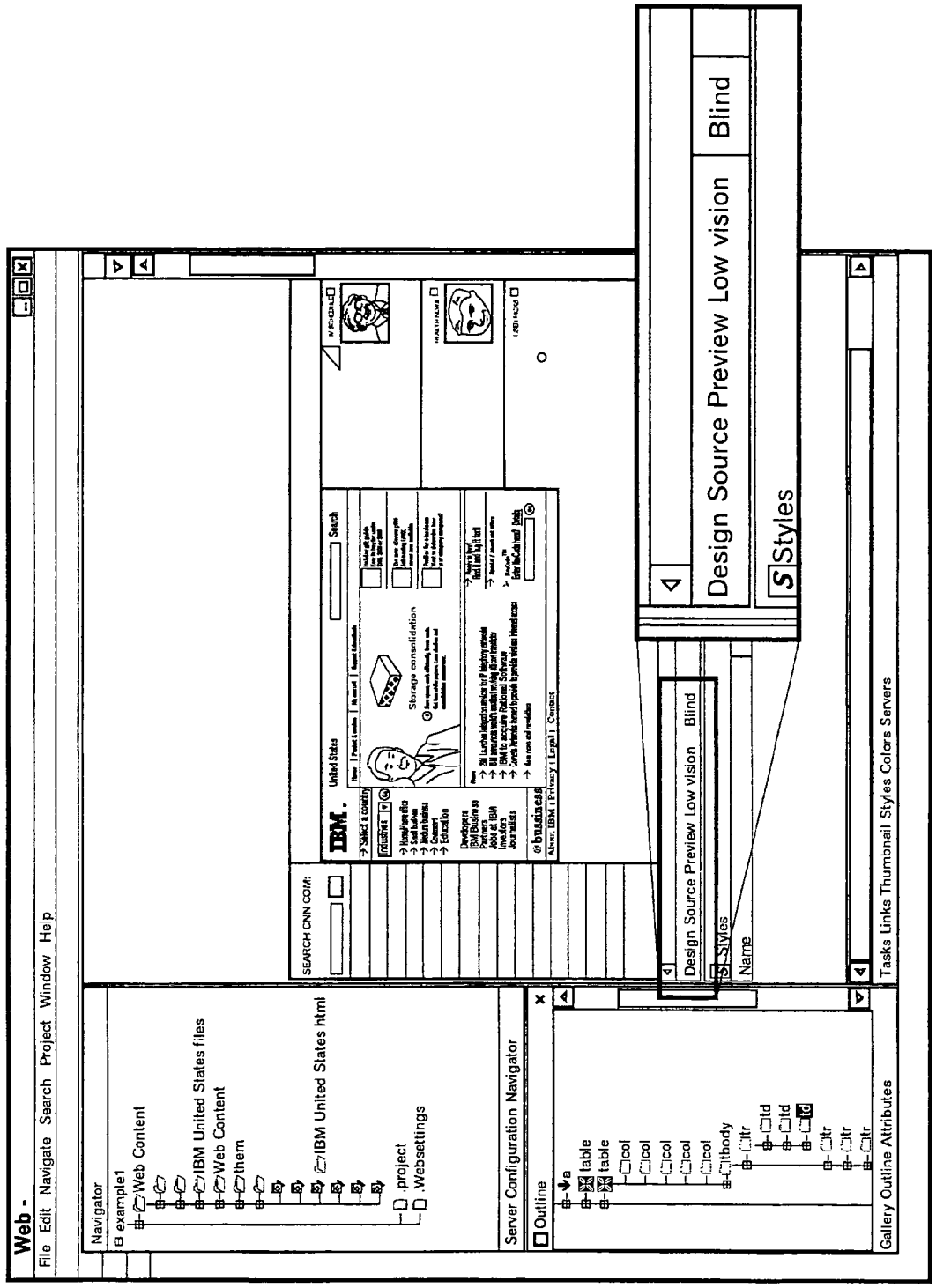
FIG. 15 shows an embodiment of the content creation system of the present invention, in the case where the above described edit process is modularized as an authoring tool of a web page creation system.

FIG. 15 shows an embodiment of the content creation system of the present invention, in the case where the above described edit process is modularized as an authoring tool of the web page creation system. In the content creation system, generally the authoring tool is provided with several modes. In the embodiment shown in FIG. 15, for example, "Design" mode corresponding to the WYSIWYG editor, "Source" mode for editing a HTML source document, and "Preview" mode which may not be edited, are provided, and they may be configured as functional modules in the information process section as shown in FIG. 4. In the embodiment of the present invention as shown in FIG. 15, as one of such nodes, for example, "Blind" mode may be implemented in the information process section. In the embodiment shown in FIG. 15, it is possible to create the page by using the Design mode or the Source mode, and start "Blind" mode as a wizard for executing the above described process, in an operation which is similar to checking the accessibility for the visual access user to the page being created during the operation, by means of the preview. In the embodiment shown in FIG. 15, it may be possible to improve the accessibility for the non-visual access user in a flow of creating one content.

Figure 16:
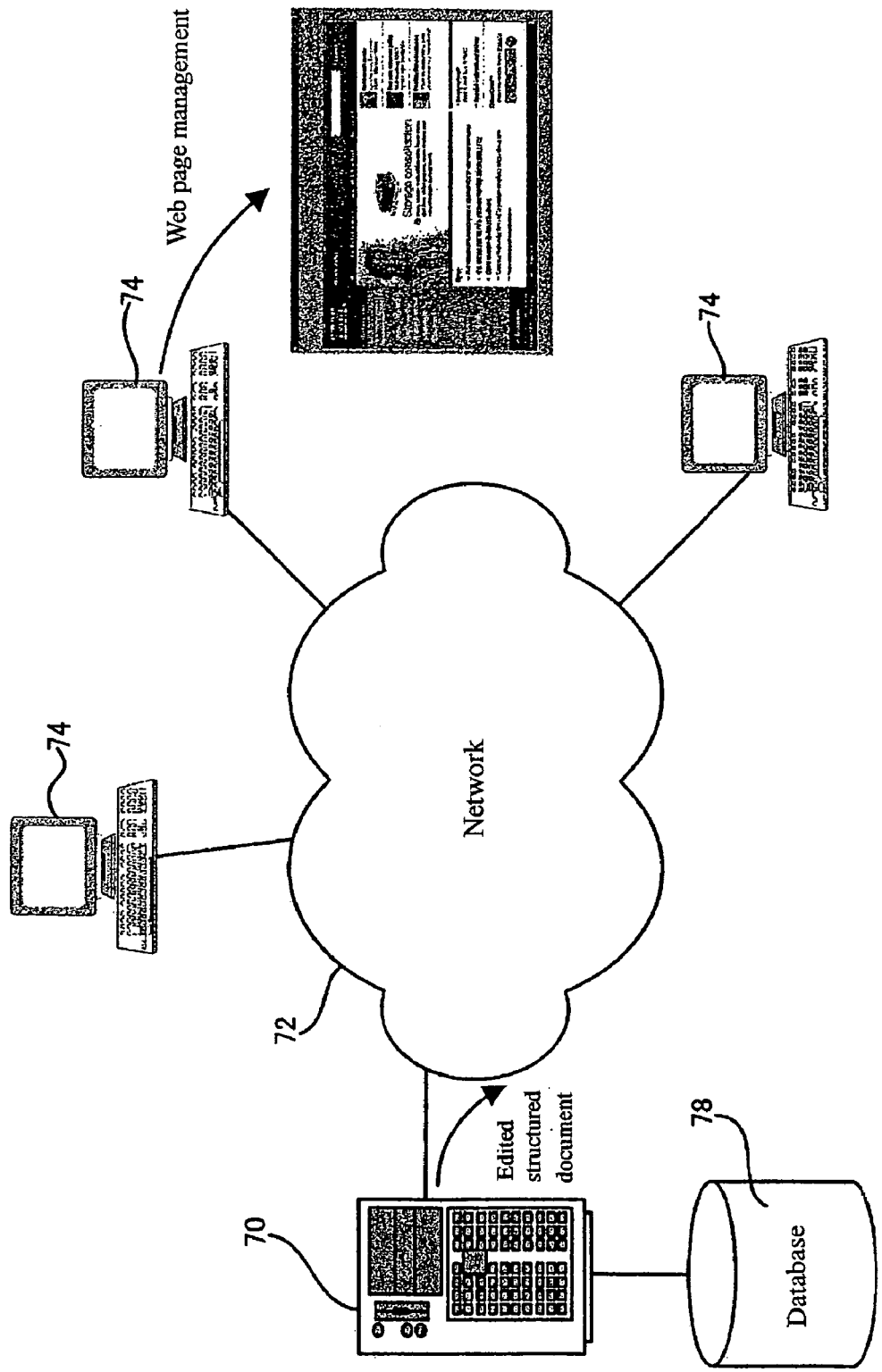
FIG. 16 shows an embodiment in which a web application for using the present invention may be provided.

In addition, in another embodiment of the content creation system of the present invention, the information process section for executing the edit process of the present invention may also be configured in the web server 28, not as the wizard, but as a web application. FIG. 16 shows an embodiment in which the web application for using the present invention may be provided. In FIG. 16, the content creation system of the present invention is included as the module of a web server 70. The server 70 is connected via a network 72 to a creator's terminal 74. The server 70 uses the browsing process section to establish transactions with the creator's terminal 74 via the network 72, and executes a task for modifying the desired accessibility for the non-visual access user. The creator's terminal 74 manages or maintains the web page or a home page created and managed by the creator. The manager or the creator is supposed to desire to enable the voice browsing with respect to the web page or the home page which he manages.

Figure 17:
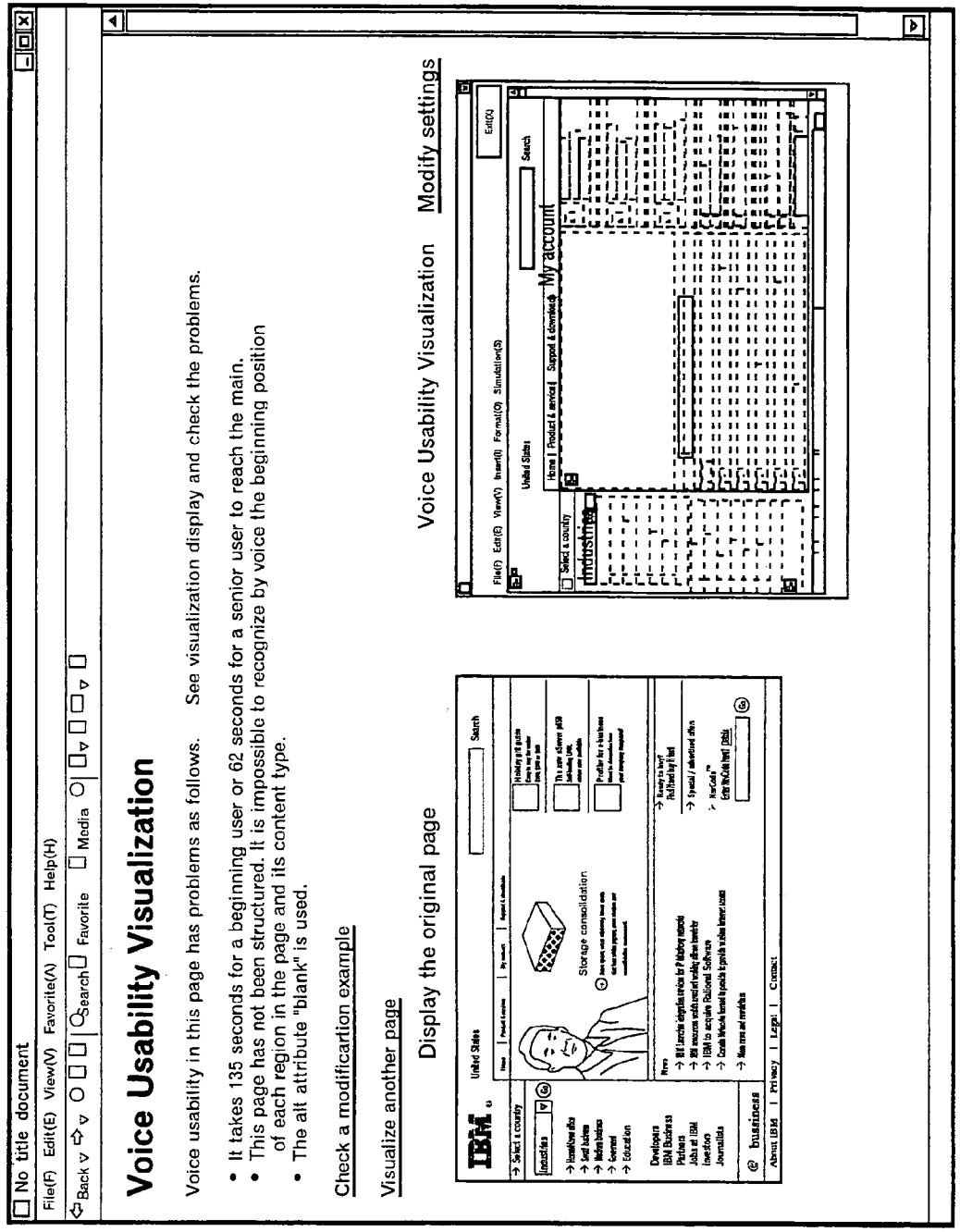
FIG. 17 shows an embodiment of the graphical user interface to be displayed on a display section of a creator's terminal, in the case where a web service is provided via a network by the content creation system of the present invention.

FIG. 17 shows an embodiment of the graphical user interface to be displayed on the display section of the creator's terminal, in the case where a web service is provided via the network by the content creation system of the present invention. As shown in FIG. 17, an original content is shown at the left side of the screen, and the accessibility generated from the edited structured document is displayed at the right side of the screen. Furthermore, at the upper side of the screen of FIG. 17, the reaching time for the non-visual access user is displayed with respect to a beginner user or a senior user. Though there is no difference essentially between the process with respect to the beginning user and the process with respect to the senior user, it is possible to give them some consideration so that, for example, an interval between the words in the voice synthesis is lengthened, or a detailed explanation document is inserted with the link command when the page is edited, and the like.

Simultaneously, it is shown on the screen that an inappropriate ALT attribute "blank" is used which needs to be modified, similarly to the embodiments of FIGS. 11 and 12. In addition, in the embodiment shown in FIG. 17, in consideration of traffic load for providing the web service and the like, instead of opening the wizard to execute the process, an active field such as "Modify settings" is arranged to display edit screens together.

The operation for providing the web service shown in FIG. 17 will be described, assuming that the creator desires to evaluate or modify voice accessibility to the web page or the home page which he has created. First, the creator inputs the URL address of the web page or the home page to be evaluated in a form on the web page provided according to the present invention, and submits the form. When the server 70 receives his request, it accesses the URL address to acquire the structured document and calculates the accessibility. The server 70 renders this result according to the present invention to create data for providing the graphic display, and sends it to an operator's terminal 74. In this case, as shown in FIG. 17, the original content and the edited structured document may be aligned for comparison.

In addition, a web page creation support system of the present invention configures the information process section as the server, and may include means for recording the speech node series (the display position in the page—the node identifier) and the time as a service log, in the voice browser. FIG. 18 shows an embodiment of the web page creation support system of the present invention including service log analysis means. The embodiment shown in FIG. 18 includes the server 70 for providing the web page, the network 72 such as the Internet connected to the server 70, and a plurality of users' terminals 74.

The server 70 manages and stores the structured document, for example, such as the DHTML document, stored in the database 76, and provides the content in response to the request from the users' terminals 74. In the embodiment explained in FIG. 18, the server 70 further includes an information process section 80 as explained in FIGS. 4 and 5 and an access log analysis module 78. The access log analysis module 78 reads results accumulated in an access log to pass the access log to the support process section included in the information process section 80 of the present invention, and then visualizes the element word and the reaching time until it is accessed, thereby it may be possible to comprehend the access by the actual user.

Furthermore, in another embodiment of the present invention, it may be possible to analyze a plurality of user test results (for example, to take an average of them), and see the test results in one view by executing the visualization display of them. This may be used as a tool for checking actual usability, on entering a test process, instead of authoring.

The visualization display with respect to a single page has been described heretofore. In the present invention, it is further possible to display the accessibility across a plurality of pages, for example, a plurality of web pages for the processes such as login, purchase and checkout in online shopping, by analyzing similarly with respect to the plurality of pages. Embodiments of visualization in this case, for example, may include a visualization method according to the following processes of:
1. in the case of using the color (gradation), arranging the plurality of pages on space, and executing the visualization display of them by means of the gradation;
2. in the case of a spatial arrangement, executing the visualization display of the plurality of pages, by integrating the respective time axes across the plurality of pages and extending the tree; and
3. in the case of a time map, first calculating the reaching times including other pages and integrating them to configure the map.

Furthermore, in another embodiment of the present invention, a reachable time has been considered as a factor for determining convenience of the web page. In addition to that, it is possible to execute the visualization display including other factors indicating "degree of inconvenience" other than the reaching time. The other factors, for example, may include a degree of disjunction between the spatial arrangement and a tag structure, including appropriateness of the ALT attributes such as a dictionary of inappropriate key words and the like, and the number of words and the like, a nested structure of a layout table and the like. Since these measures do not have values increasing gradually like the reachable time, it is effective to employ an embodiment for displaying the factors by combining with a method of expanding only a problematic portion by means of a Fisheye View method for example, in addition to the color, the time map and the spatial arrangement.

It is possible to provide the manager or the creator with a more specific check function by providing the above described visualization display with interactivity. For example, in the visualization display as explained in FIG. 12, the reaching time from the beginning of the page (BODY tag beginning position) is calculated and the visualization display of it is executed statically. In addition, it is also possible to employ an embodiment for executing the visualization display of the reaching time dynamically, by calculating in real time the reaching time from the display position pointed following (or clicked with) a pointing device such as a mouse to the display position to which the pointing device moves, with reference to the time display mapping table, by means of a pop-up display and the like.

Furthermore, it is also possible to create a link of "Move to next portlet" at the beginning of the block of contents to be referred to as each portlet, by implementing the content creation method of the present invention in the information process section, together with software which allows the creator to combine arbitrary contents to create the page, such as existing software, WebSphere Portal Server (WPS)®. In this embodiment, it is possible to check the reaching time to the next portlet only by moving the cursor with pointer means to each portlet and calculating the reaching time to the link position.

It may be possible to consider the usability of the voice browsing, easily in an ordinary web page authoring process, by including a visualization function of the present invention in the web page authoring tool, without adding another software. Furthermore, the present invention integrates various appearances and functions referred to as "View" in many authoring tools into a concept referred to as "View", and provides it. The present invention may also be configured as one module of the above described "View" functions. Therefore, according to the present invention, it is possible to edit one content (HTML, JSP and the like) in its appearance (WYSIWYG editor), fine adjust the content at a tag level (source document editor), and check the actual operation of the content (web browser). Thereby, by providing a graphical user interface function according to the present invention as one of these Views, it may be possible to realize improvement of voice usability in the authoring process.

Heretofore, though the present invention has been described based on the particular embodiments shown in the drawings of the present invention, the present invention is not limited to the described particular embodiments. In addition, the system and respective functional portions of the present invention may be configured as functional means which is realized by causing the computer to execute a program, therefore it is not necessarily required to implement them as functional configurations as shown in the drawings. In addition, programming languages with respect to the program of the present invention may include C language, C++ language, Java® and the like. In addition, a computer executable program of the present invention may be stored and delivered in a ROM, an EEPROM, a flash memory, a CD-ROM, a DVD, a flexible disk, a hard disk and the like.

The invention claimed is:

1. A method for assessing the non-visual accessibility of a structured document, the method comprising computer-implemented acts of:

generating a speech node series from the structured document;

using at least one processor, determining a reaching time to a predetermined node of the speech node series, the reaching time comprising an estimated duration for voice synthesis from the start of the speech node series to the predetermined node;

rendering, for display, information indicative of the reaching time;

receiving a modification command to modify the reaching time to the predetermined node;

in response to the modification command, modifying the speech node series; and determining a modified reaching time to the predetermined node, the modified reaching time comprising a modified estimated duration for voice synthesis from the start of the modified speech node series to the predetermined node.

2. The method of claim 1, wherein the act of rendering comprises rendering the information for display with at least a portion of the structured document.

3. The method of claim 1, further comprising:
rendering, for display, information indicative of the modified reaching time.

4. The method of claim 1, wherein the act of modifying the speech node series comprises inserting a link in the structured document.

5. The method of claim 1, wherein the act of modifying the speech node series comprises inserting a page index in the structured document.

6. The method of claim 1, wherein the estimated duration is based at least in part on a number of words in a portion of the structured document corresponding to a portion of the speech node series up to the predetermined node.

7. The method of claim 1, wherein the estimated duration is based at least in part on an estimated speed of voice synthesis.

8. The method of claim 1, wherein generating a speech node series from the structured document comprises acts of:
parsing the structured document to generate nodes in a Document Object Model (DOM) tree structure; and
generating the speech node series from the nodes in the DOM tree structure.

9. An apparatus for assessing the non-visual accessibility of a structured document, the apparatus comprising:
a computer-readable storage medium to store processor-executable instructions;
an input/output interface; and
a processing unit communicatively coupled to the computer-readable storage medium and input/output interface, wherein upon execution of the processor-executable instructions by the processing unit, the processing unit:
generates a speech node series from the structured document;
determines a reaching time to a predetermined node of the speech node series, the reaching time comprising an estimated duration for voice synthesis from the start of the speech node series to the predetermined node;
renders, for display, information indicative of the reaching time;
controls the input/output interface to receive a modification command to modify the reaching time to the predetermined node;
modifies, in response to the modification command, the speech node series; and
determines a modified reaching time to the predetermined node, the modified reaching time comprising a modified estimated duration for voice synthesis from the start of the modified speech node series to the predetermined node.

10. The apparatus of claim 9, wherein the processing unit renders the information for display with at least a portion of the structured document.

11. The apparatus of claim 9, wherein the processing unit: renders, for display, information indicative of the modified reaching time.

12. The apparatus of claim 9, wherein modifying the speech node series comprises inserting a link in the structured document.

13. The apparatus of claim 9, wherein modifying the speech node series comprises inserting a page index in the structured document.

14. The apparatus of claim 9, wherein the estimated duration is based at least in part on a number of words in a portion of the structured document corresponding to a portion of the speech node series up to the predetermined node.

15. The apparatus of claim 9, wherein the estimated duration is based at least in part on an estimated speed of voice synthesis.

16. The apparatus of claim 9, wherein the processing unit:
parses the structured document to generate nodes in a Document Object Model (DOM) tree structure; and
generates the speech node series from the nodes in the DOM tree structure.

17. A non-transitory computer-readable storage medium having stored thereon a computer-executable program that, when executed by a computer, performs a method for assessing the non-visual accessibility of a structured document, the method comprising acts of:
generating a speech node series from the structured document;
determining a reaching time to a predetermined node of the speech node series, the reaching time comprising an estimated duration for voice synthesis from the start of the speech node series to the predetermined node;
displaying information indicative of the reaching time;
receiving a modification command to modify the reaching time to the predetermined node;
in response to the modification command, modifying the speech node series; and
determining a modified reaching time to the predetermined node, the modified reaching time comprising a modified estimated duration for voice synthesis from the start of the modified speech node series to the predetermined node.

18. The computer-readable storage medium of claim 17, wherein the act of displaying comprises displaying the information with at least a portion of the structured document.

19. The computer-readable storage medium of claim 17, wherein the method further comprises acts of:
displaying information indicative of the modified reaching time.

20. The computer-readable storage medium of claim 17, wherein the act of modifying the speech node series comprises inserting a link and/or a page index in the structured document.

21. The computer-readable storage medium of claim 17, wherein the estimated duration is based at least in part on a number of words in a portion of the structured document corresponding to a portion of the speech node series up to the predetermined node.

22. The computer-readable storage medium of claim 17, wherein the estimated duration is based at least in part on an estimated speed of voice synthesis.

23. The computer-readable storage medium of claim 17, wherein generating a speech node series from the structured document comprises acts of:
parsing the structured document to generate nodes in a Document Object Model (DOM) tree structure; and
generating the speech node series from the nodes in the DOM tree structure.

* * * * *